(12) United States Patent
Sasaki et al.

(10) Patent No.: US 8,373,938 B2
(45) Date of Patent: Feb. 12, 2013

(54) LENS UNIT

(75) Inventors: Naoki Sasaki, Saitama (JP); Ryota Sasaki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 117 days.

(21) Appl. No.: 12/910,418

(22) Filed: Oct. 22, 2010

(65) Prior Publication Data
US 2011/0122511 A1    May 26, 2011

(30) Foreign Application Priority Data
Nov. 20, 2009    (JP) ................................ 2009-265542

(51) Int. Cl.
*G02B 7/02* (2006.01)
(52) U.S. Cl. ........................................ 359/819; 359/811
(58) Field of Classification Search .................. 359/811, 359/819
See application file for complete search history.

(56) References Cited

U.S. PATENT DOCUMENTS

| 7,457,052 | B2 | 11/2008 | Hirata |
| 2006/0018041 | A1 | 1/2006 | Hirata |
| 2009/0290239 | A1* | 11/2009 | Wu ................................ 359/819 |
| 2011/0149417 | A1* | 6/2011 | Huang .......................... 359/738 |

FOREIGN PATENT DOCUMENTS

JP    2006-79073 A    3/2006

* cited by examiner

*Primary Examiner* — William Choi
(74) *Attorney, Agent, or Firm* — Birch, Stewart, Kolasch & Birch, LLP

(57) ABSTRACT

Among three lenses housed in a lens barrel, a first lens and a second lens are adjacent to each other. A position regulating section is a part where a first protrusion of the first lens is formed. A shielding member is provided at a position interposed between the first lens and the second lens and limits a passing luminous flux. An engagement section is a part of the shielding member, and in this part, there is formed an opening into which the first protrusion of the first lens enters. The engagement section engages with the position regulating section, and thereby the position of the shielding member in a direction crossing an optical axis is regulated.

10 Claims, 19 Drawing Sheets

LENS UNIT

BACKGROUND OF THE INVENTION

1. Field of the Invention

The present invention relates to a lens unit in which a shielding member that limits a passing luminous flux is interposed between adjacent optical components.

2. Description of the Related Art

Conventionally, among lens units of such as a camera of a camera-equipped portable telephone and a vehicle-mounted camera, there is, for example, a lens unit that has a shielding member disposed at a position interposed between plural adjacent lenses and limiting a passing range of a luminous flux.

As a technique for fixing such a shielding member, there has been disclosed, for example, a technique of disposing, between a first lens and a second lens adjacent to each other, a sheet-like shielding member provided with an aperture section that limits an incident range of incident light to a certain range, thereby fixing the shielding member (see, for example, Japanese Patent Application Publication No. 2006-79073).

Here, a device equipped with a lens unit is often used in an environment where the temperature changes. For example, the vehicle-mounted camera is exposed to a high temperature as well as a low temperature. In the technique in which the shielding member is interposed between the first lens and the second lens adjacent to each other as disclosed in Japanese Patent Application Publication No. 2006-79073, there is a possibility that the lens or the shielding member may expand or shrink due to a change in ambient temperature, thereby causing a misalignment of the shielding member in a direction crossing an optical axis.

SUMMARY OF THE INVENTION

In view of the foregoing, it is an object of the present invention to provide a lens unit in which a misalignment of the shielding member in a direction crossing an optical axis is prevented.

A lens unit according to an aspect of the present invention includes:

plural optical components including a lens, a lens barrel that contains and holds the plural optical components; and a shielding member that is disposed at a position interposed between a first component and a second component adjacent each other of the optical components housed in the lens barrel and limits a passing luminous flux, wherein at least one of the first component and the second component has a position regulating section that regulates a position of the shielding member in a direction crossing an optical axis, and the shielding member has an engagement section that engages with the position regulating section.

Here, "the plural optical components" according to the present invention include plural lenses, and a combination of a component disposed between and linking adjacent lenses and the lenses.

In the lens unit of the present invention, with the position regulating section, which is provided in at least one of the first component and the second component adjacent to each other among the plural optical components housed in the lens barrel, the engagement section of the shielding member that is disposed at the position interposed between the first component and the second component and limits the passing luminous flux engages, so that the position of this shielding member in the direction crossing in the optical axis is regulated. Therefore, according to the lens unit of the present invention, even when, for example, the optical component or the shielding member expands or shrinks due to a change in temperature, a misalignment of the shielding member in the direction crossing the optical axis is prevented by the engagement between the position regulating section and the engagement section.

Here, in the lens unit according to the aspect of the present invention, it is preferable that each of the position regulating section and the engagement section is provided at each of plural locations.

According to this preferable aspect, a misalignment of the shielding member is suppressed further reliably.

In addition, in the lens unit according to the aspect of the present invention, it is preferable that the engagement section has an opening provided in the shielding member, and the position regulating section has a first protrusion that is formed in the first component and enters into the opening.

According to this preferable aspect, the first protrusion of the first component enters into the opening of the shielding member, and thereby the position of the shielding member in the direction crossing the optical axis is regulated, and a misalignment of the shielding member in the direction crossing the optical axis is prevented. Further, the shielding member having the opening may be easily obtained by, for example, processing a film made of resin or by molding a resin.

Further, in the lens unit including the first protrusion of the lens unit according to the aspect of the present invention, it is preferable that the second component has a first depression at a position facing the opening, and the first protrusion is a protrusion having a height which enables the first protrusion to pass through the opening of the shielding member and enter into the first depression.

According to this preferable aspect, the first protrusion of the first component passes through the opening of the shielding member and enters into the first depression of the second component, and thereby the position of the shielding member in the direction crossing the optical axis is regulated, and a misalignment of the shielding member in the direction crossing the optical axis is prevented.

In addition, in the lens unit according to the aspect of the present invention, it is preferable that the engagement section has a second protrusion that is formed in the shielding member and protrudes toward the first component, and the position regulating section has a second depression that is formed in the first component and receives the second protrusion.

According to this preferable aspect, the second protrusion formed on the shielding member and protruding toward the first component is received by the second depression of the first component, and thereby the position of the shielding member in the direction crossing the optical axis is regulated, and a misalignment of the shielding member in the direction crossing the optical axis is prevented. Further, the shielding member having the second protrusion may be easily obtained by, for example, molding a resin.

In addition, in the lens unit including the second protrusion of the lens unit according to the aspect of the present invention, it is preferable that the second protrusion is a protrusion with a third depression formed in a surface on the second component side of the shielding member.

Such a third shielding member having the second protrusion with the depression may be easily obtained by, for example, molding a resin.

In addition, in the lens unit including the second protrusion of the lens unit according to the aspect of the present invention, it is preferable the second protrusion is a protrusion with a third depression formed in a surface on the second component side of the shielding member, and the second component has a third protrusion that enters into the third depression.

According to this preferable aspect, the second protrusion formed on the shielding member and protruding toward the first component is received by the second depression of the first component, and the third protrusion of the second component enters into the third depression formed in the surface on the second component side of the shielding member. Therefore, the position of the shielding member in the direction crossing the optical axis is regulated, and a misalignment of the shielding member in the direction crossing the optical axis is prevented. Further, the shielding member having the second protrusion with the third depression may be easily obtained by, for example, molding a resin.

Further, in the lens unit according to the aspect of the present invention, it is preferable that the engagement section has a shape with a third depression formed in a surface on the second component side of the shielding member and protruding toward the first component, and
the position regulating section has a fourth protrusion that is formed in the second component and enters into the third depression.

According to this preferable aspect, the forth protrusion of the second component enters into the third depression in the surface on the second component side of the shielding member, and thereby the position of the shielding member in the direction crossing the optical axis is regulated, and a misalignment of the shielding member in the direction crossing the optical axis is prevented. Further, the shielding member, which has the shape with the third depression in the surface on the second component side and protruding toward the first component, may be easily obtained by, for example, molding a resin.

According to the present invention, there is provided the lens unit in which the position of the shielding member in the direction crossing the optical axis is regulated, and a misalignment of the shielding member in the direction crossing the optical axis is prevented.

DETAILED DESCRIPTION OF THE INVENTION

Embodiments of the present invention will be described below with reference to the drawings.

Figure 1:
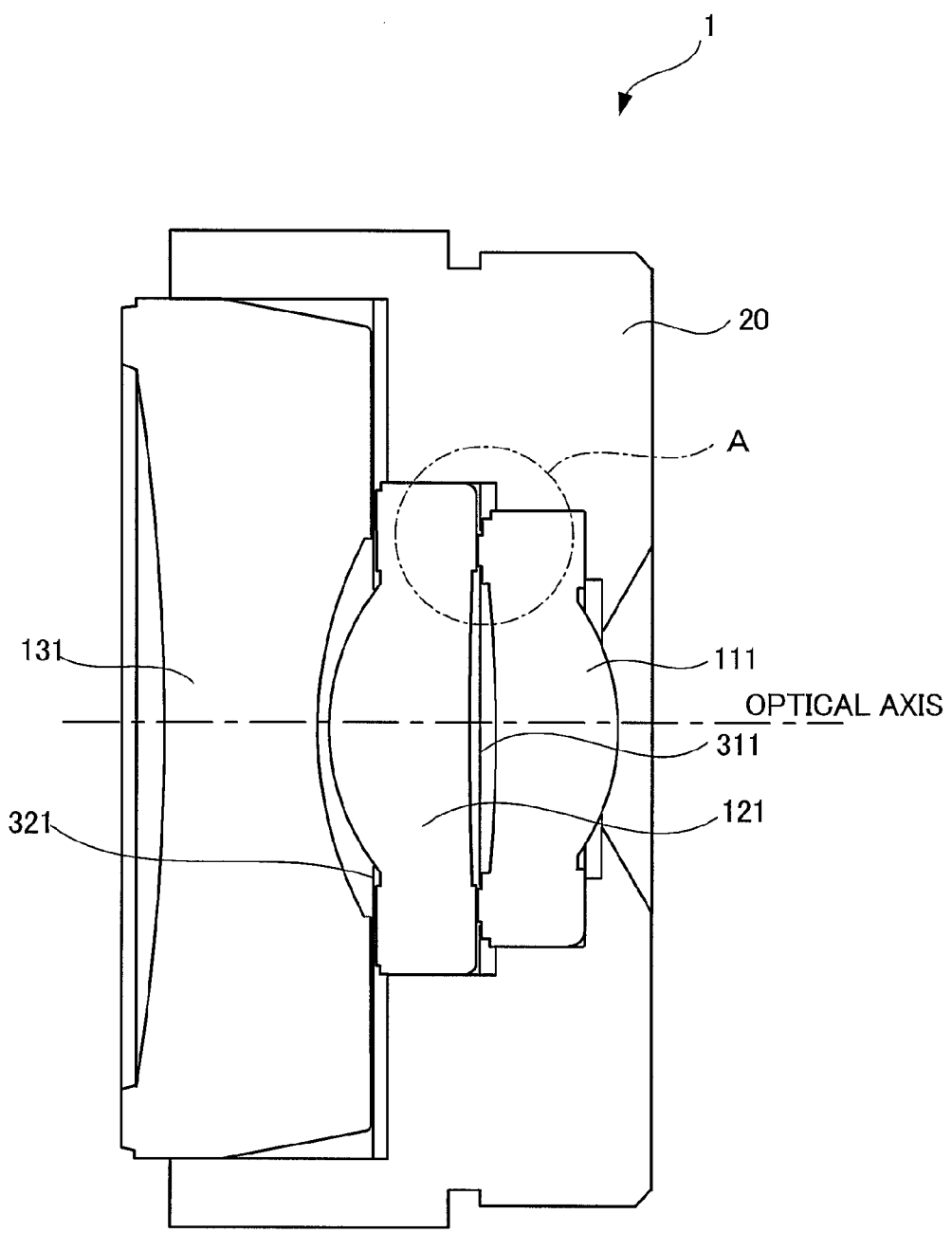
FIG. 1 is a diagram that illustrates a longitudinal section of a lens unit 1 that is a first embodiment of the present invention.
Figure 2:
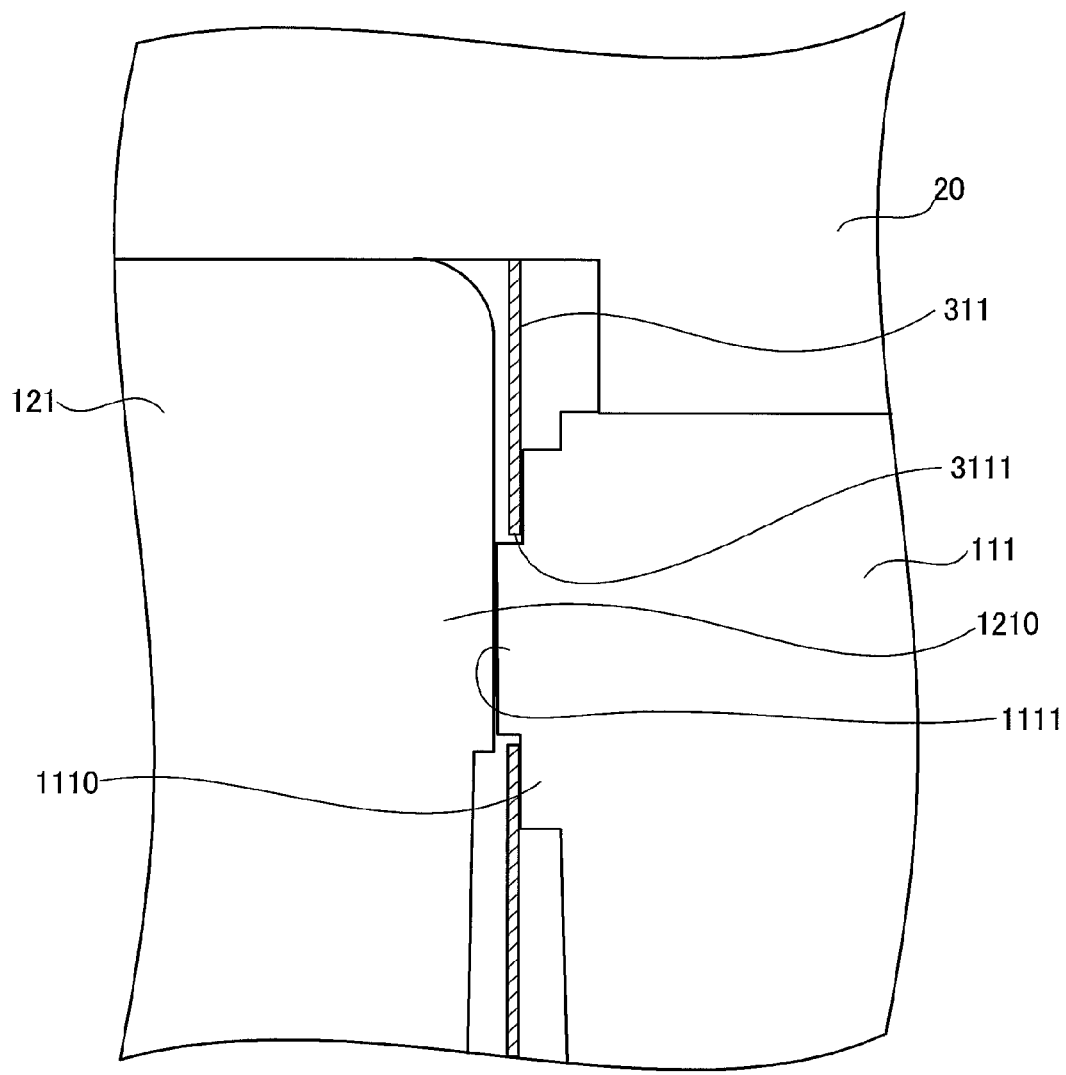
FIG. 2 is an enlarged view of a part A illustrated in FIG. 1.
Figure 3:
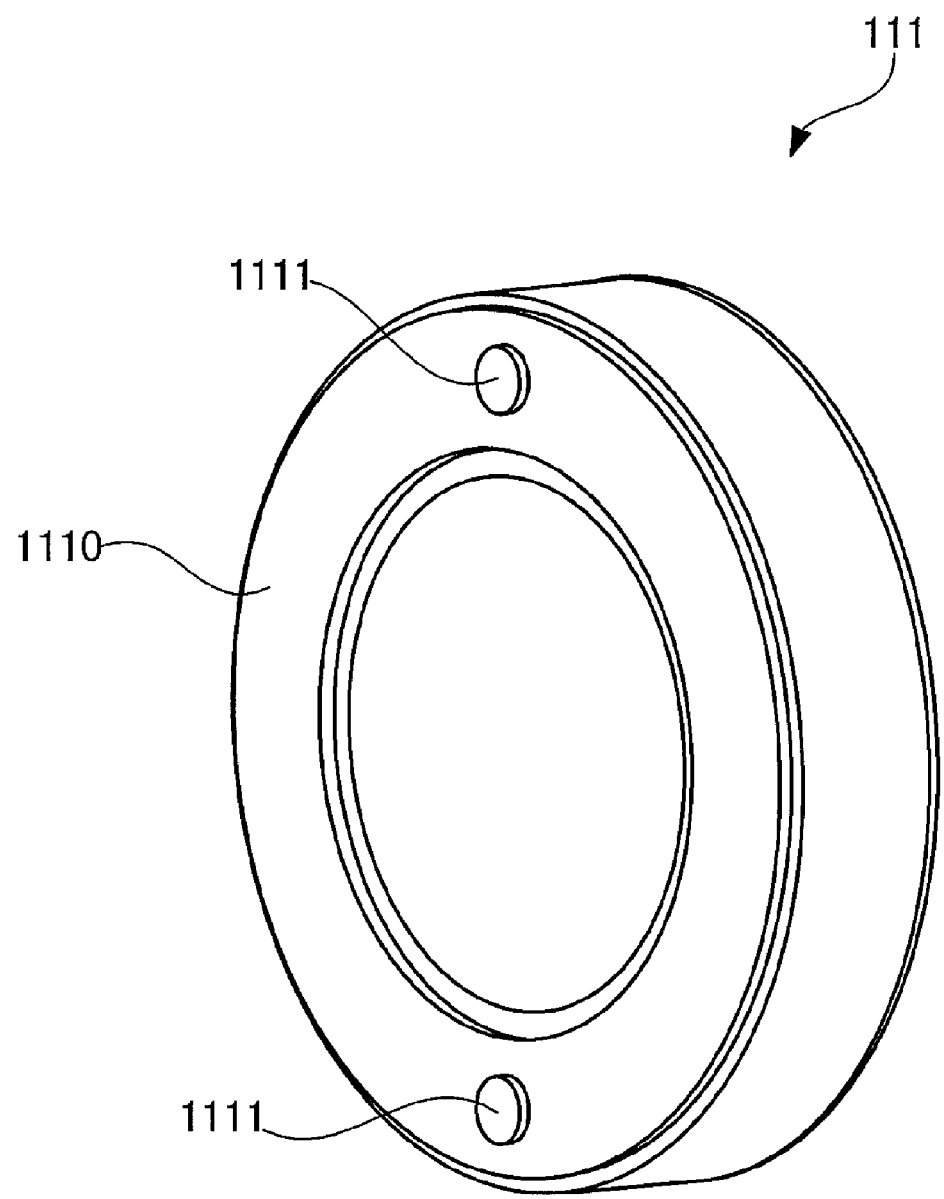
FIG. 3 is a perspective view of a first lens 111 illustrated in FIG. 1 when viewed from a side where a second lens 121 is provided.

FIG. 1 is a diagram that illustrates a longitudinal section of a lens unit 1 that is a first embodiment of the present invention. Further, FIG. 2 is an enlarged view of a part A illustrated in FIG. 1, and FIG. 3 is a perspective view of a first lens 111 illustrated in FIG. 1 when viewed from a side where a second lens 121 is provided.

As illustrated in FIG. 1, the lens unit 1 of the first embodiment includes three lenses 111, 121 and 131, a lens barrel 20, and two shielding members 311 and 321. The lens unit 1 becomes a camera when an imaging device (not illustrated) is attached to the lens unit 1.

The lens barrel 20 houses and holds the three lenses 111, 121 and 131. This lens barrel 20 is equivalent to an example of the lens barrel according to the present invention.

The three lenses 111, 121 and 131 housed in the lens barrel 20 are plastic lenses and disposed to overlap an optical axis in order of the first lens 111, the second lens 121, the third lens 131, from a side where the imaging device is disposed such that each optical axes of the three lenses overlaps one another. Further, the first lens 111 and the second lens 121 are adjacent to each other, and the second lens 121 and the third lens 131 adjacent to each other. These three lenses 111, 121 and 131 are equivalent to an example of the plural optical components according to the present invention. Furthermore, the first lens 111 among these three lenses 111, 121 and 131 is equivalent to an example of the first component according to the present invention, and the second lens 121 among these three lenses 111, 121 and 131 is equivalent to an example of the second component according to the present invention.

Each of the shielding members 311 and 321 is a sheet-like object in which, for example, a PET (polyethylene terephthalate) film is used as a base, and which is made of resin and has a thickness of a few tens of μm. The shielding members 311 and 321 are provided to limit a passing luminous flux, thereby preventing irregular reflections within the lens barrel 20 resulting from unnecessary light. Of the two shielding members 311 and 321, the shielding member 311 is disposed at a position interposed between the first lens 111 and the second lens 121 adjacent to each other. Further, of the two shielding members 311 and 321, the shielding member 321 is disposed at a position interposed between the second lens 121 and the third lens 131 adjacent to each other. Furthermore, a light passing opening (not illustrated) is formed in the center of each of the shielding members 311 and 321, and the light passing through the lens closer to an object side than the shielding members 311 and 321 passes through the light passing opening and enters the adjacent lens. The shielding member 311 disposed at the position interposed between the first lens 111 and the second lens 121 adjacent to each other is equivalent to an example of the shielding member according to the present invention.

As illustrated in FIG. 2 and FIG. 3, a first protrusion 1111 is formed at a flange section 1110 of the first lens 111, of the first lens 111 and the second lens 121 between which the shielding member 311 is interposed. The first protrusion 1111 is formed at each of two locations in the first lens 111, and more specifically, the first protrusion 1111 is provided on each of opposite sides of the optical axis (see FIG. 1) that is the center of the first lens 111. Of this first lens 111, a part where the first protrusion 1111 is formed is equivalent to an example of the position regulating section according to the present invention, and the first protrusion 1111 is equivalent to an example of the first protrusion according to the present invention.

Further, as illustrated in FIG. 2, the shielding member 311 disposed at the position interposed between the first lens 111 and the second lens 121 adjacent to each other has an opening 3111 into which the first protrusion 1111 of the first lens 111 enters. This opening 3111 is formed at each of two locations in the shielding member 311, and more specifically, the opening 3111 is formed on each of opposite sides of the optical axis (see FIG. 1) that is the center of the first lens 111. Of this shielding member 311, a part where the opening 3111 is formed is equivalent to an example of the engagement section according to the present invention, and the opening 3111 is equivalent to an example of the opening according to the present invention.

Furthermore, as illustrated in FIG. 2, the first protrusion 1111 of the first lens 111 is formed to be higher than the thickness of the shielding member 311, and the first protrusion 1111 entering into the opening 3111 of the shielding member 311 passes through the opening 3111 and contacts a flange section 1210 of the second lens 121.

According to the lens unit 1 of the first embodiment, when the first protrusion 1111 of the first lens 111 enters into the opening 3111 of the shielding member 311, the position of the shielding member 311 in a direction crossing the optical axis is regulated, and a misalignment of the shielding member 311 in the direction crossing the optical axis is prevented.

Further, according to the lens unit 1 of the first embodiment, the first lens 111 and the second lens 121 contact each other directly and thus, these lenses are spaced with high accuracy. Incidentally, the shielding member 311 has a clearance with respect to the second lens 121, but this clearance does not cause an optical influence as long as this clearance is minute.

This concludes the description of the first embodiment of the present invention, and the second embodiment of the present invention will be described.

Incidentally, the second embodiment to be described below is an embodiment in which the first lens 111 of the first embodiment is replaced with a first lens 112 different from this first lens 111.

In the following, the same elements as those in the first embodiment will be given the same reference characters as those of the first embodiment and the description will be omitted, and only features different from the first embodiment will be described.

Figure 4:
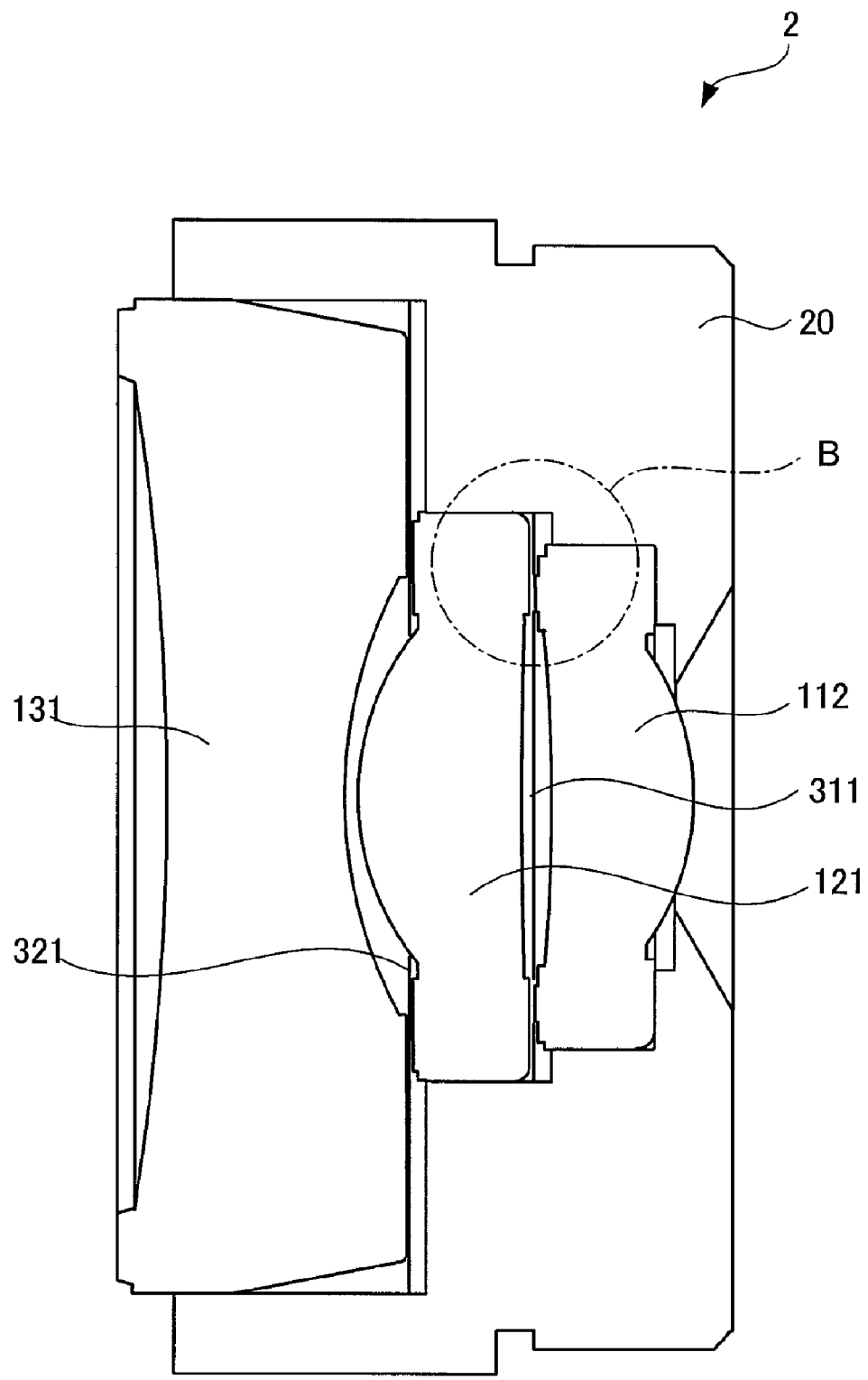
FIG. 4 is a diagram that illustrates a longitudinal section of a lens unit 2 that is the second embodiment of the present invention.

FIG. 4 is a diagram that illustrates a longitudinal section of a lens unit 2 that is the second embodiment of the present invention. Further, FIG. 5 is an enlarged view of a part B illustrated in FIG. 4.

As illustrated in FIG. 4, the lens unit 2 of the second embodiment includes the three lenses 112, 121 and 131, the lens barrel 20, and the two shielding members 311 and 321.

Among the three lenses 112, 121 and 131 housed in the lens barrel 20, the first lens 112 and the second lens 121 are adjacent to each other. These three lenses 112, 121 and 131 are equivalent to an example of the plural optical components according to the present invention. Further, the first lens 112 among these three lenses 112, 121 and 131 is equivalent to an example of the first component according to the present invention.

Figure 5:
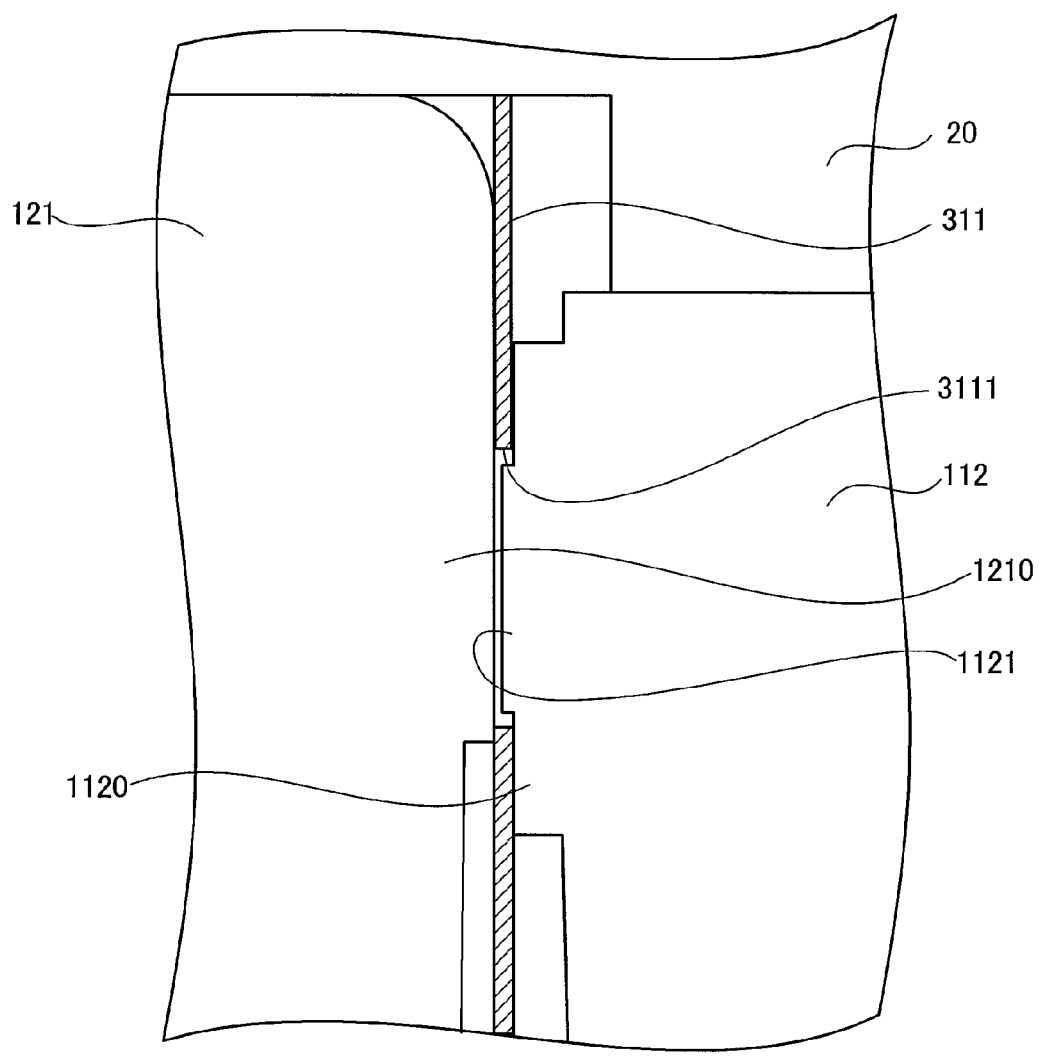
FIG. 5 is an enlarged view of a part B illustrated in FIG. 4.

As illustrated in FIG. 5, a first protrusion 1121 is formed at a flange section 1120 of the first lens 112, of the first lens 112 and the second lens 121 between which the shielding member 311 is interposed. Of this first lens 112, a part where the first protrusion 1121 is formed is equivalent to an example of the position regulating section according to the present invention, and the first protrusion 1121 is equivalent to an example of the first protrusion according to the present invention.

Further, as illustrated in FIG. 5, the first protrusion 1121 of the first lens 112 is formed to be lower than the thickness of the shielding member 311, and the shielding member 311 is interposed between the flange section 1120 of the first lens 112 and the flange section 1210 of the second lens 121.

According to the lens unit 2 of the second embodiment, the first protrusion 1121 of the first lens 111 enters into the opening 3111 of the shielding member 311, and thereby the position of the shielding member 311 in the direction crossing the optical axis is regulated, a misalignment of the shielding member 311 in the direction crossing the optical axis is prevented.

Further, according to the lens unit 2 of the second embodiment, the shielding member 311 contacts both of the first lens 112 and the second lens 121 and thus, the shielding member 311 is fixed further reliably.

This concludes the description of the second embodiment of the present invention, and a third embodiment of the present invention will be described.

Incidentally, the third embodiment to be described below is an embodiment in which the first lens 111 of the first embodiment is replaced with a first lens 113 different from this first lens 111, and the second lens 121 of the first embodiment is replaced with a second lens 122 different from this second lens 121.

In the following, the same elements as those in the first embodiment will be given the same reference characters as those of the first embodiment and the description will be omitted, and only features different from the first embodiment will be described.

Figure 6:
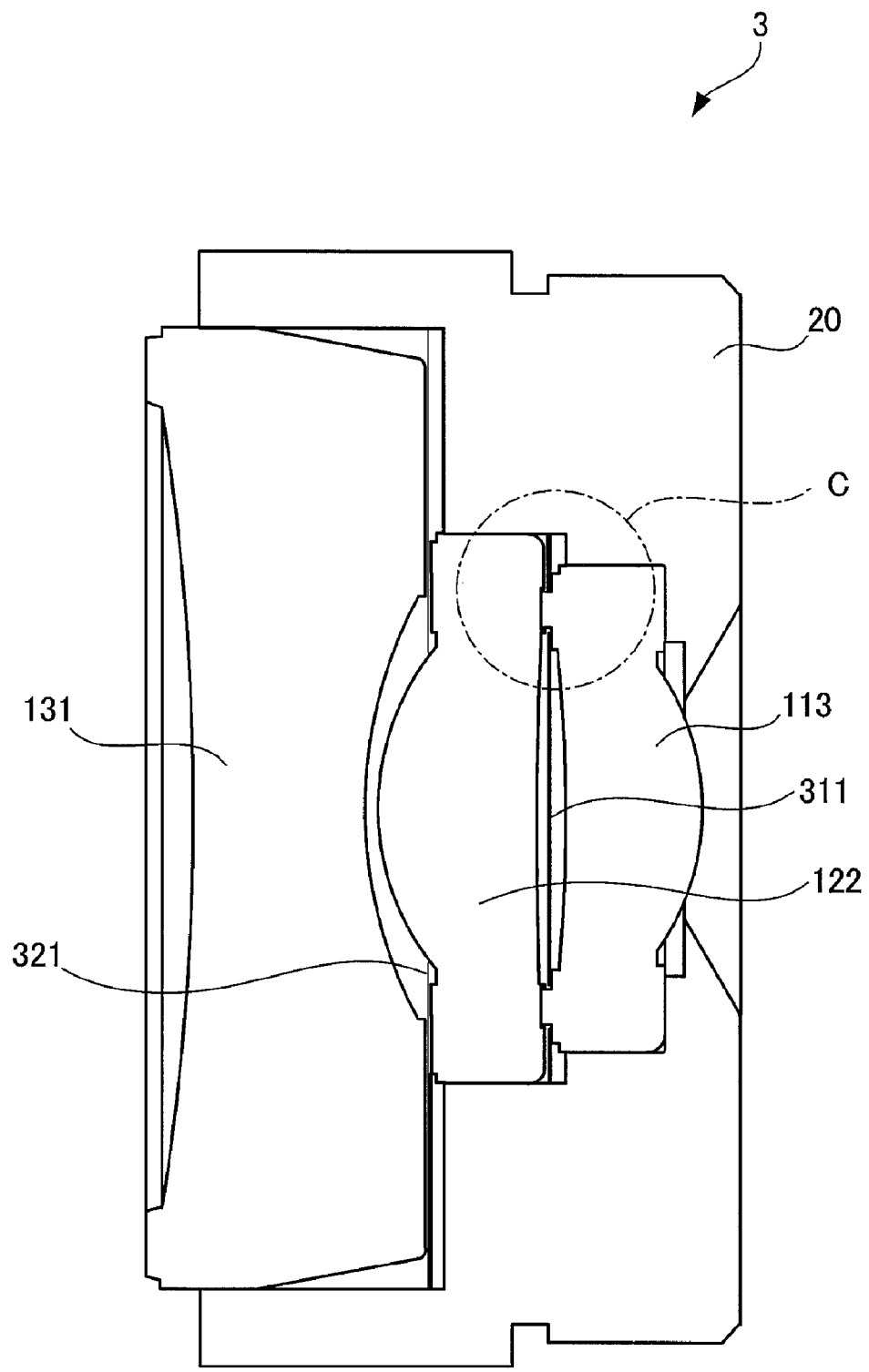
FIG. 6 is a diagram that illustrates a longitudinal section of a lens unit 3 that is the third embodiment of the present invention.

FIG. 6 is a diagram that illustrates a longitudinal section of a lens unit 3 that is the third embodiment of the present invention. Further, FIG. 7 is an enlarged view of a part C illustrated in FIG. 6.

As illustrated in FIG. 6, the lens unit 3 of the third embodiment includes the three lenses 113, 122 and 131, the lens barrel 20, and the two shielding members 311 and 321.

Among the three lenses 113, 122 and 131 housed in the lens barrel 20, the first lens 113 and the second lens 122 are adjacent to each other. Further, among these three lenses 113, 122 and 131, the second lens 122 and the third lens 131 are adjacent to each other. These three lenses 113, 122 and 131 are equivalent to an example of the plural optical components according to the present invention. Further, among these three lenses 113, 122 and 131, the first lens 113 is equivalent to an example of the first component according to the present invention, and the second lens 122 is equivalent to an example of the second component according to the present invention.

Figure 7:
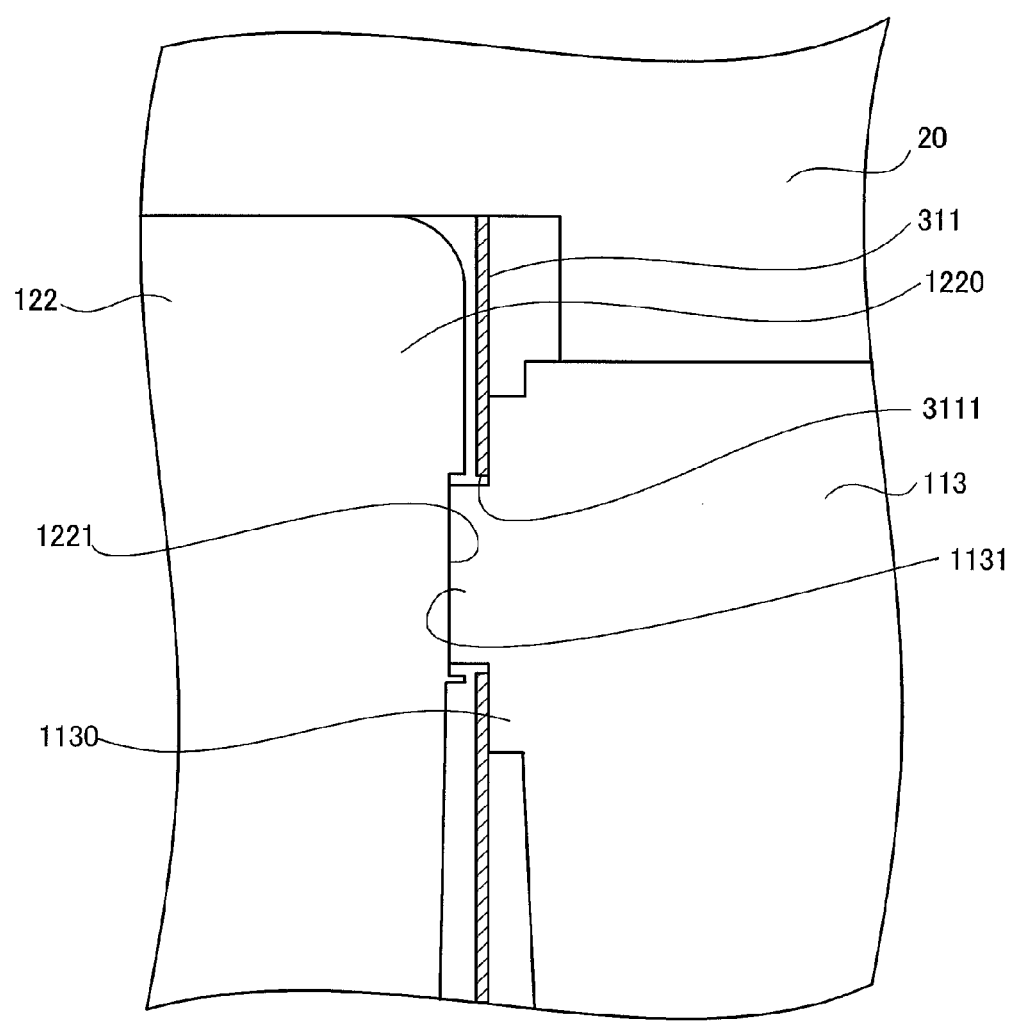
FIG. 7 is an enlarged view of a part C illustrated in FIG. 6.

As illustrated in FIG. 7, a first protrusion 1131 is formed at a flange section 1130 of the first lens 113, of the first lens 113 and the second lens 122 between which the shielding member 311 is interposed. Of this first lens 113, apart where the first protrusion 1131 is formed is equivalent to an example of the position regulating section according to the present invention, and the first protrusion 1131 is equivalent to an example of the first protrusion according to the present invention.

Further, as illustrated in FIG. 7, a first depression 1221 is formed at a flange section 1220 of the second lens 122, of the first lens 113 and the second lens 122 between which the shielding member 311 is interposed. The first depression 1221 is formed at a position facing the opening 3111 of the shielding member 311. This first depression 1221 of the second lens 122 is equivalent to an example of the first depression according to the present invention.

Furthermore, as illustrated in FIG. 7, the first protrusion 1131 of the first lens 113 is formed to be higher than the thickness of the shielding member 311, and has a height that enables the first protrusion 1131 to pass through the opening 3111 of the shielding member 311 and enter into the first depression of the second lens 122. Further, the first protrusion 1131 of the first lens 113, which has entered into the first depression 1221 of the second lens 122, contacts the first depression 1221 of the second lens 122.

According to the lens unit 3 of the third embodiment, the first protrusion 1131 of the first lens 113 passes through the opening 3111 of the shielding member 311 and enters into the first depression 1221 of the second lens 122, and thereby the position of the shielding member 311 in the direction crossing the optical axis is regulated, and a misalignment of the shielding member 311 in the direction crossing the optical axis is prevented.

Further, according to the lens unit 3 of the third embodiment, the first lens 113 and the second lens 122 contact each other directly and thus, these lenses are spaced with high accuracy. Incidentally, the shielding member 311 has a clearance with respect to the second lens 122, but this clearance does not cause an optical influence as long as this clearance is minute.

This concludes the description of the third embodiment of the present invention, and a fourth embodiment of the present invention will be described.

Incidentally, the fourth embodiment to be described below is an embodiment in which the first lens 113 of the third embodiment is replaced with a first lens 114 different from this first lens 113.

In the following, the same elements as those in the third embodiment will be given the same reference characters as those of the third embodiment and the description will be omitted, and only features different from the third embodiment will be described.

Figure 8:
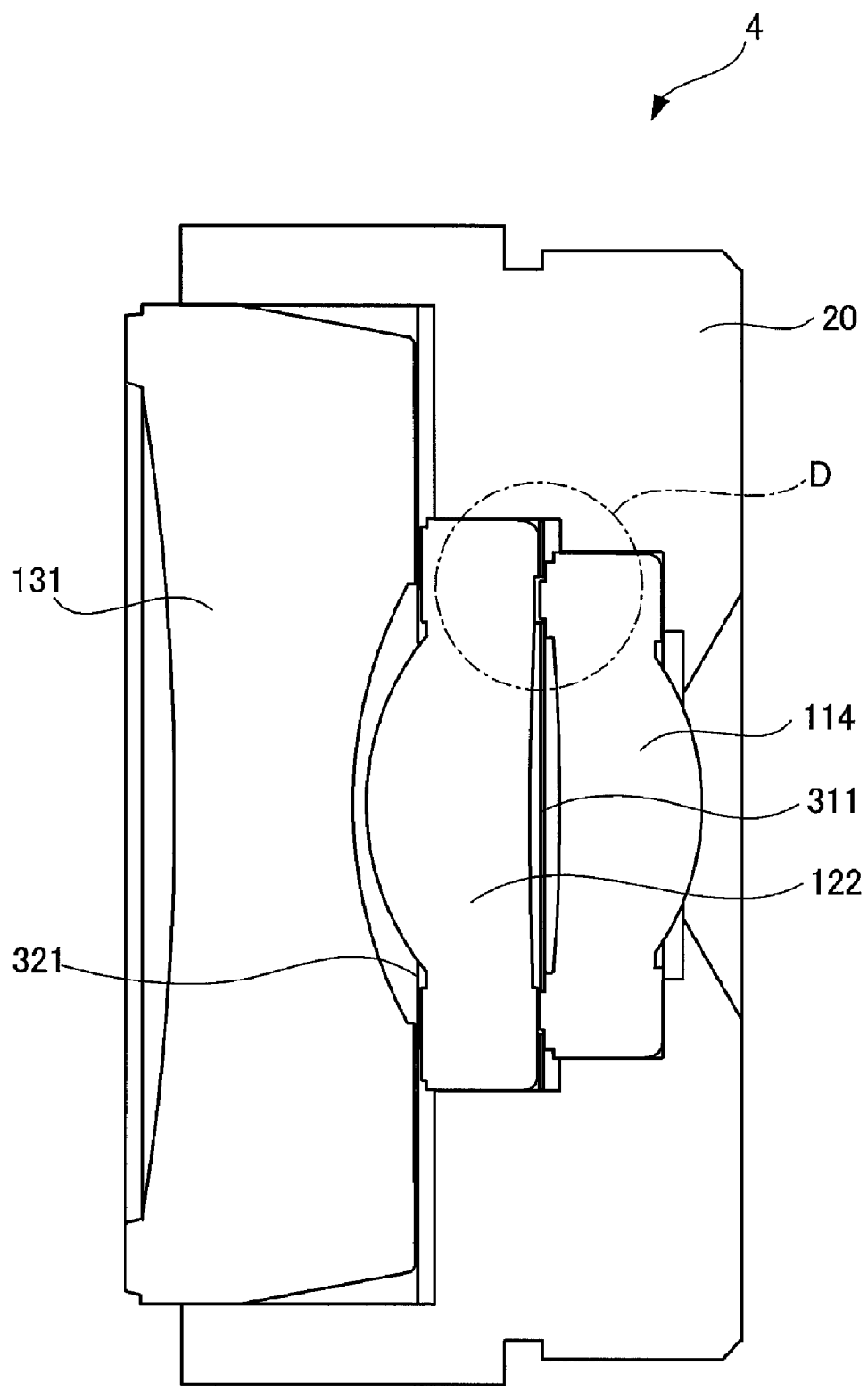
FIG. 8 is a diagram that illustrates a longitudinal section of a lens unit 4 that is the fourth embodiment of the present invention.

FIG. 8 is a diagram that illustrates a longitudinal section of a lens unit 4 that is the fourth embodiment of the present invention. Further, FIG. 9 is an enlarged view of a part D illustrated in FIG. 8.

As illustrated in FIG. 8, the lens unit 4 of the fourth embodiment includes the three lenses 114, 122 and 131, the lens barrel 20, and the two shielding members 311 and 321.

Among the three lenses 114, 122 and 131 housed in the lens barrel 20, the first lens 114 and the second lens 122 are adjacent to each other. These three lenses 114, 122 and 131 are equivalent to an example of the plural optical components according to the present invention. Further, the first lens 114 among these three lenses 114, 122 and 131 is equivalent to an example of the first component according to the present invention.

Figure 9:
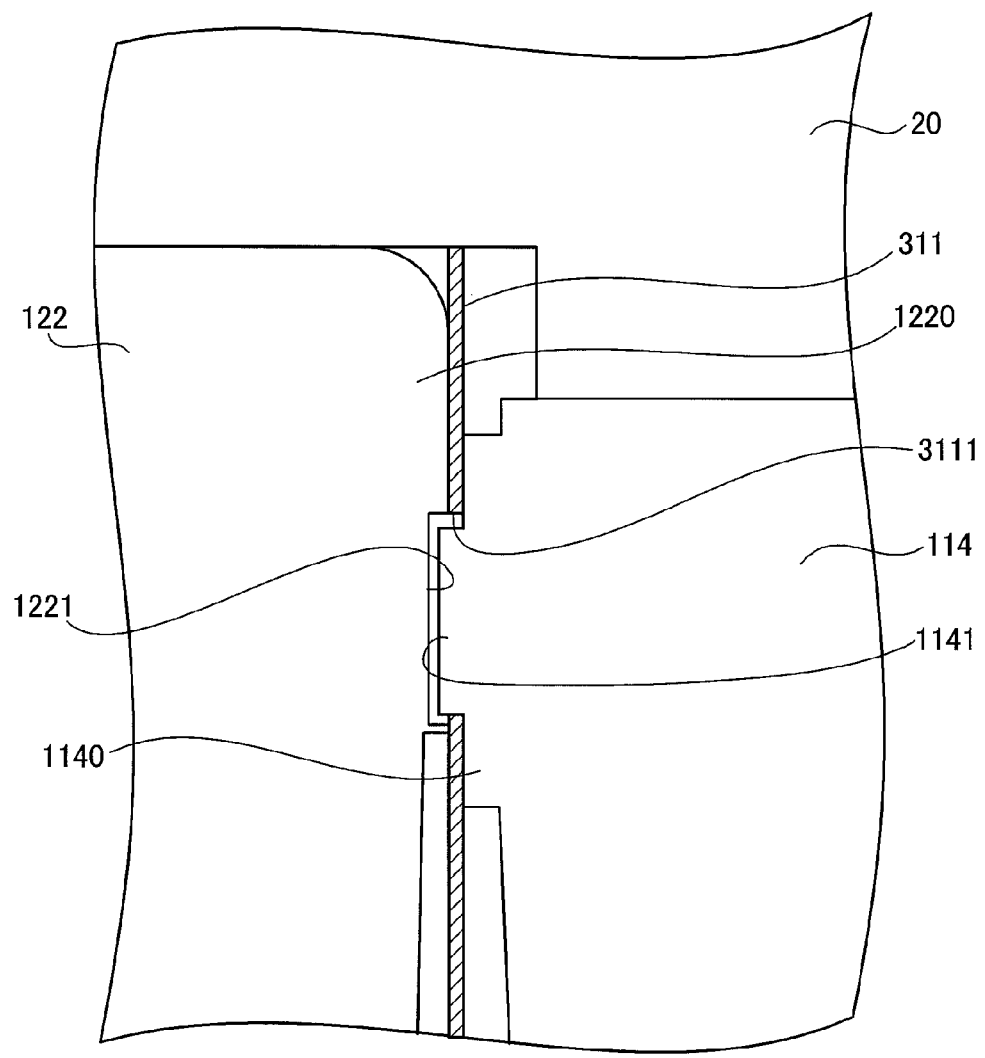
FIG. 9 is an enlarged view of a part D illustrated in FIG. 8.

As illustrated in FIG. 9, a first protrusion 1141 is formed at a flange section 1140 of the first lens 114, of the first lens 114 and the second lens 122 between which the shielding member 311 is interposed. Of this first lens 114, apart where the first protrusion 1141 is formed is equivalent to an example of the position regulating section according to the present invention, and the first protrusion 1141 is equivalent to an example of the first protrusion according to the present invention.

Further, as illustrated in FIG. 9, the first protrusion 1141 of the first lens 114 is formed to be higher than the thickness of the shielding member 311, and has a height that enables the first protrusion 1141 to pass through the opening 3111 of the shielding member 311 and enter into the first depression of the second lens 122. Furthermore, the first protrusion 1141 entering into the first depression 1221 of the second lens 122 is disposed away from the first depression 1221 of the second lens 122, and the shielding member 311 is interposed between the flange section 1140 of the first lens 114 and the flange section 1220 of the second lens 122.

According to the lens unit 4 of the fourth embodiment, the first protrusion 1141 of the first lens 114 passes through the opening 3111 of the shielding member 311 and enters into the first depression 1221 of the second lens 122, and thereby the position of the shielding member 311 in the direction crossing the optical axis is regulated, and a misalignment of the shielding member 311 in the direction crossing the optical axis is prevented.

Further, according to the lens unit 4 of the fourth embodiment, the shielding member 311 contacts both of the first lens 114 and the second lens 122 and thus, the shielding member 311 is fixed further reliably.

This concludes the description of the fourth embodiment of the present invention, and a fifth embodiment of the present invention will be described.

Incidentally, the fifth embodiment to be described below is an embodiment in which the first lens 111 of the first embodiment is replaced with a first lens 115 different from the first lens 111, and the shielding member 311 of the first embodiment is replaced with a shielding member 312 different from this shielding member 311.

In the following, the same elements as those in the first embodiment will be given the same reference characters as those of the first embodiment and the description will be omitted, and only features different from the first embodiment will be described.

Figure 10:
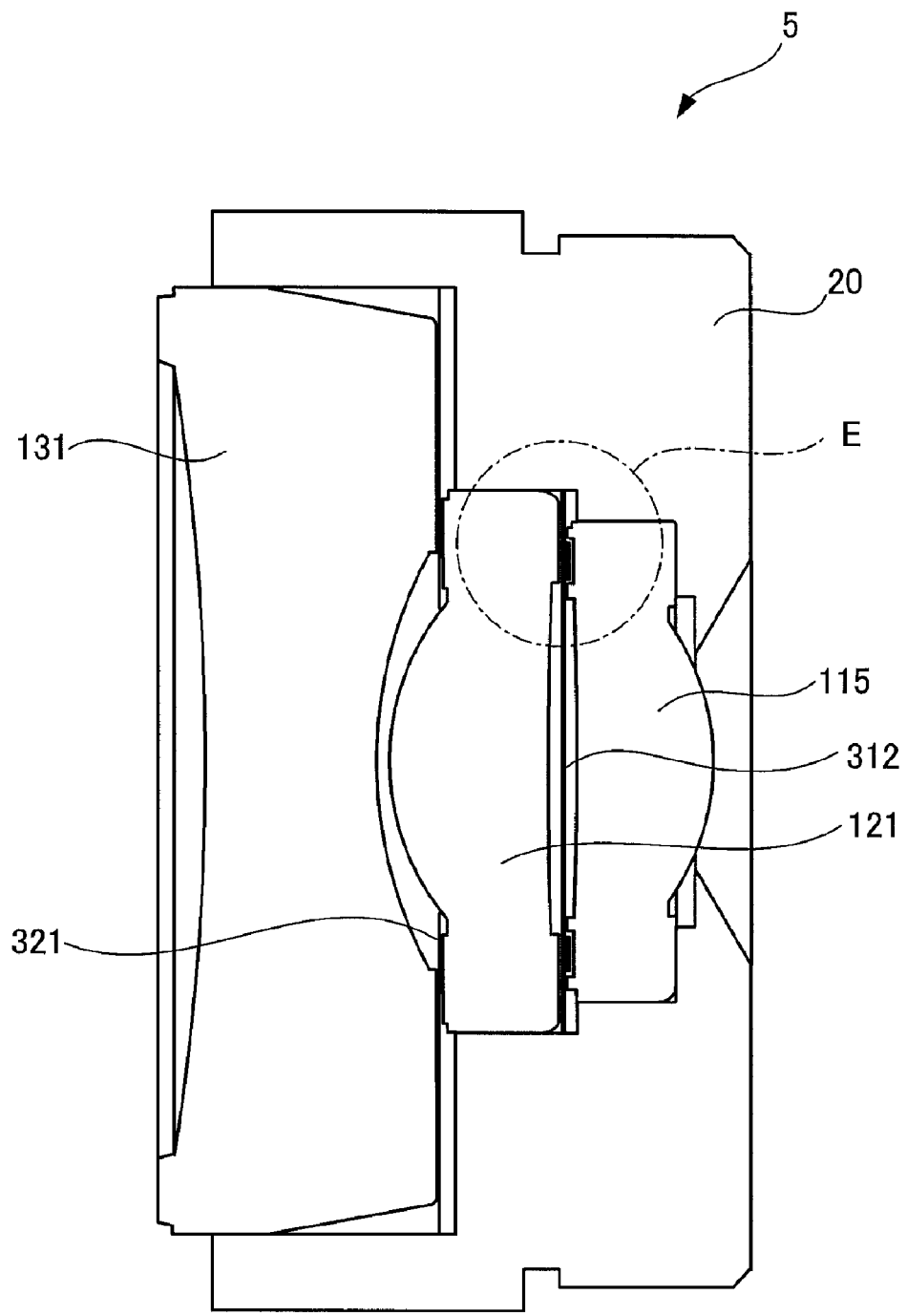
FIG. 10 is a diagram that illustrates a longitudinal section of a lens unit 5 that is the fifth embodiment of the present invention.
Figure 11:
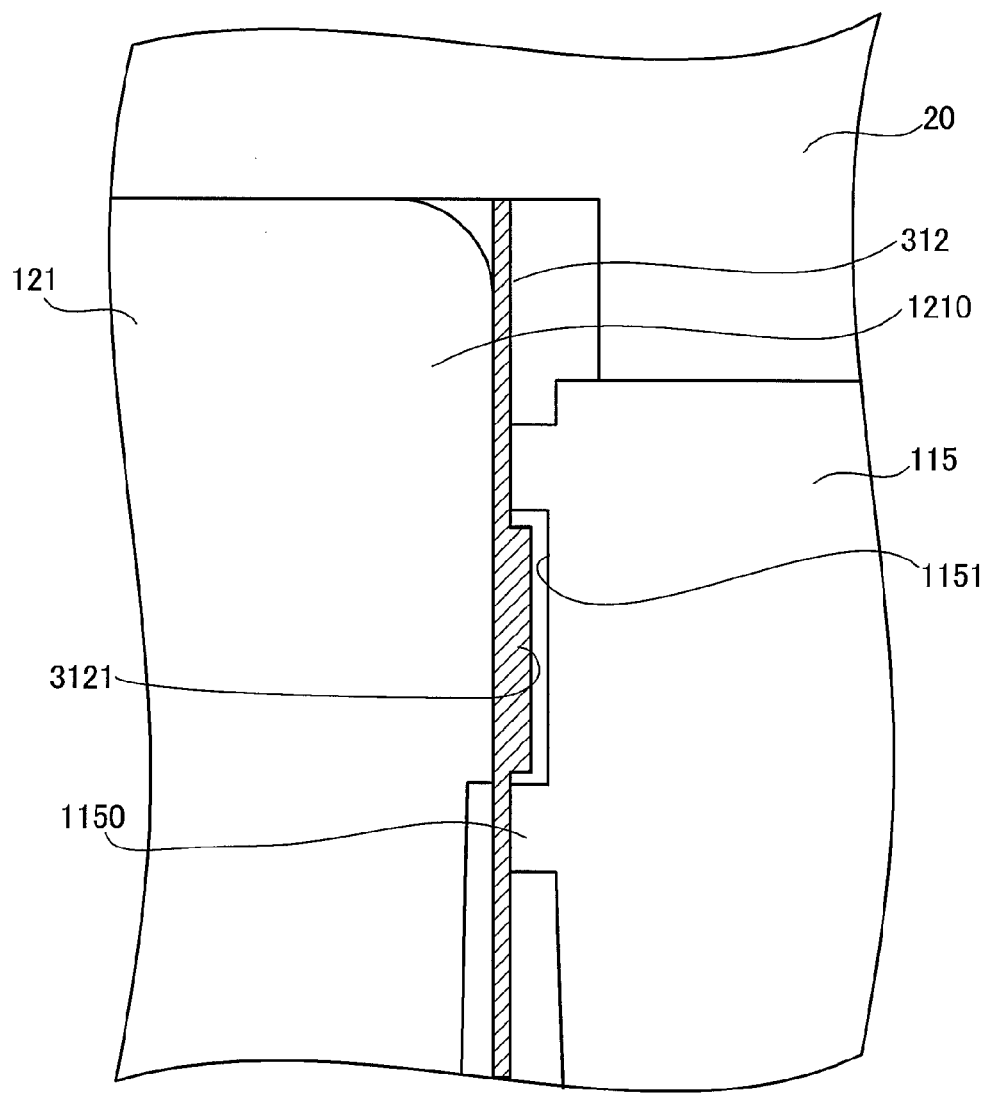
FIG. 11 is an enlarged view of a part E illustrated in FIG. 10.

FIG. 10 is a diagram that illustrates a longitudinal section of a lens unit 5 that is the fifth embodiment of the present invention. Further, FIG. 11 is an enlarged view of a part E illustrated in FIG. 10.

As illustrated in FIG. 10, the lens unit 5 of the fifth embodiment includes the three lenses 115, 121 and 131, the lens barrel 20, and the two shielding members 312 and 321.

Among the three lenses 115, 121 and 131 housed in the lens barrel 20, the first lens 115 and the second lens 121 are adjacent to each other. These three lenses 115, 121 and 131 are equivalent to an example of the plural optical components according to the present invention. The first lens 115 among these three lenses 115, 121 and 131 is equivalent to an example of the first component according to the present invention.

The shielding member 312 is a sheet-like object formed by molding, for example, a polycarbonate and having a thickness of a few tens of μm, and limits a passing luminous flux. Of the two shielding members 312 and 321, the shielding member 312 is disposed at a position interposed between the first lens 115 and the second lens 121 adjacent to each other. This shielding member 312 disposed at the position interposed between the first lens 115 and the second lens 121 adjacent to each other is equivalent to an example of the shielding member according to the present invention.

As illustrated in FIG. 11, a second depression 1151 is formed at a flange section 1150 of the first lens 115, of the first lens 115 and the second lens 121 between which the shielding member 312 is interposed. Of this first lens 115, a part where the second depression 1151 is formed is equivalent to an example of the position regulating section according to the present invention, and the second depression 1151 is equivalent to an example of the second depression according to the present invention.

Further, as illustrated in FIG. 11, the shielding member 312 disposed at the position interposed between the first lens 115 and the second lens 121 adjacent to each other has a second protrusion 3121 to be received by the second depression 1151 of the first lens 115 and protruding toward the first lens 115. Of this shielding member 312, a part where the second protrusion 3121 is provided is equivalent to an example of the engagement section according to the present invention, and the second protrusion 3121 is equivalent to an example of the second protrusion according to the present invention.

Furthermore, as illustrated in FIG. 11, the second protrusion 3121 of the shielding member 312 is formed to be lower than the second depression 1151 of the first lens 115, and the shielding member 312 is interposed between the flange section 1150 of the first lens 115 and the flange section 1210 of the second lens 121.

According to the lens unit 5 of the fifth embodiment, the second protrusion 3121 formed on the shielding member 312 and protruding toward the first lens 115 is received by the second depression 1151 of the first lens 115, and thereby the position of the shielding member 312 in a direction crossing the optical axis is regulated, and a misalignment of the shielding member 312 direction crossing the optical axis is prevented.

Further, according to the lens unit 5 of the fifth embodiment, the shielding member 312 contacts both of the first lens 115 and the second lens 121 and thus, the shielding member 312 is fixed further reliably.

This concludes the description of the fifth embodiment of the present invention, and a sixth embodiment of the present invention will be described.

Incidentally, the sixth embodiment to be described below is an embodiment in which the first lens 111 of the first embodiment is replaced with a first lens 116 different from this first lens 111, and the shielding member 311 of the first embodiment is replaced with a shielding member 313 different from this shielding member 311.

In the following, the same elements as those in the first embodiment will be given the same reference characters as those of the first embodiment and the description will be omitted, and only features different from the first embodiment will be described.

Figure 12:
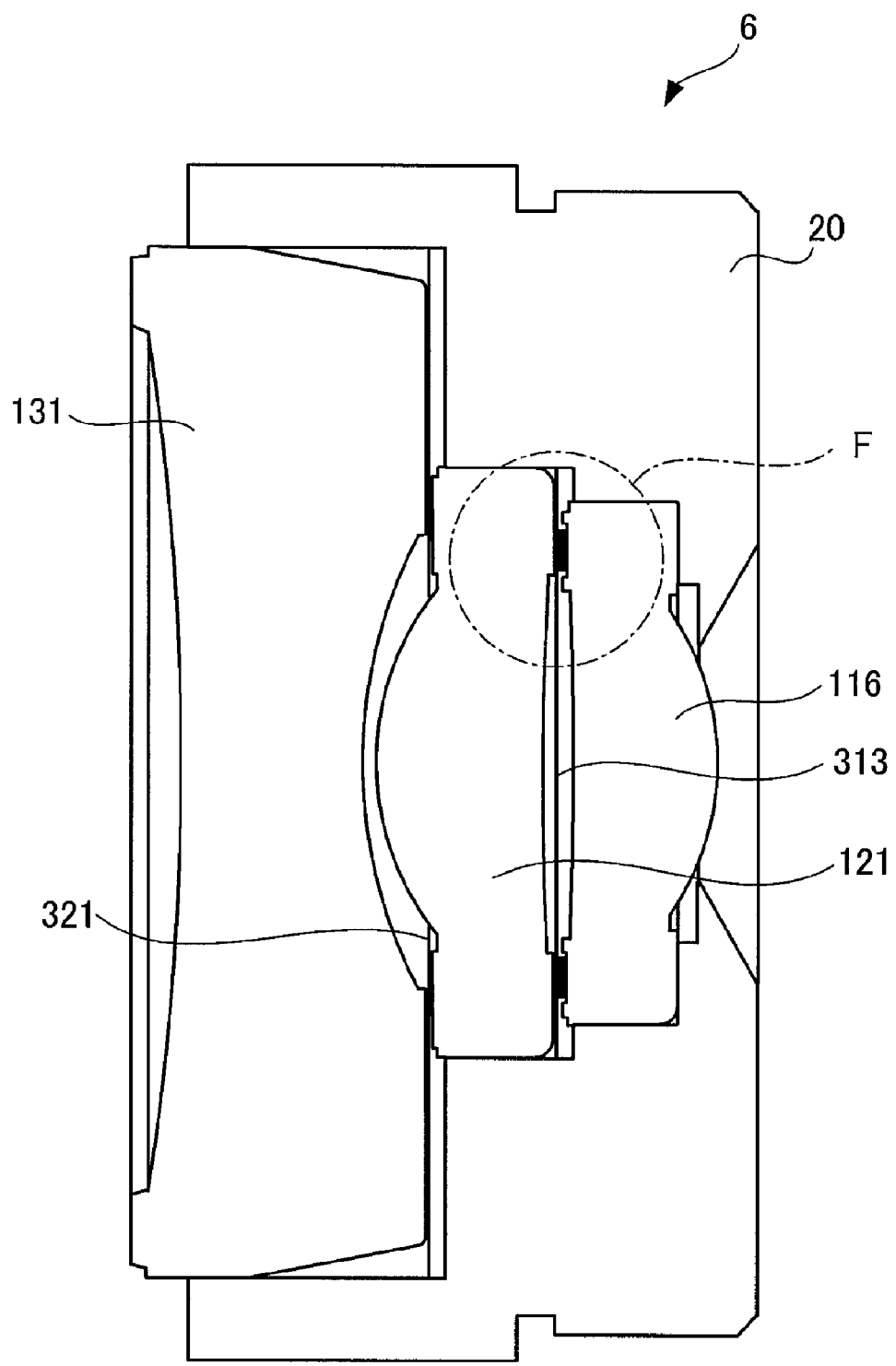
FIG. 12 is a diagram that illustrates a longitudinal section of a lens unit 6 that is the sixth embodiment of the present invention.
Figure 13:
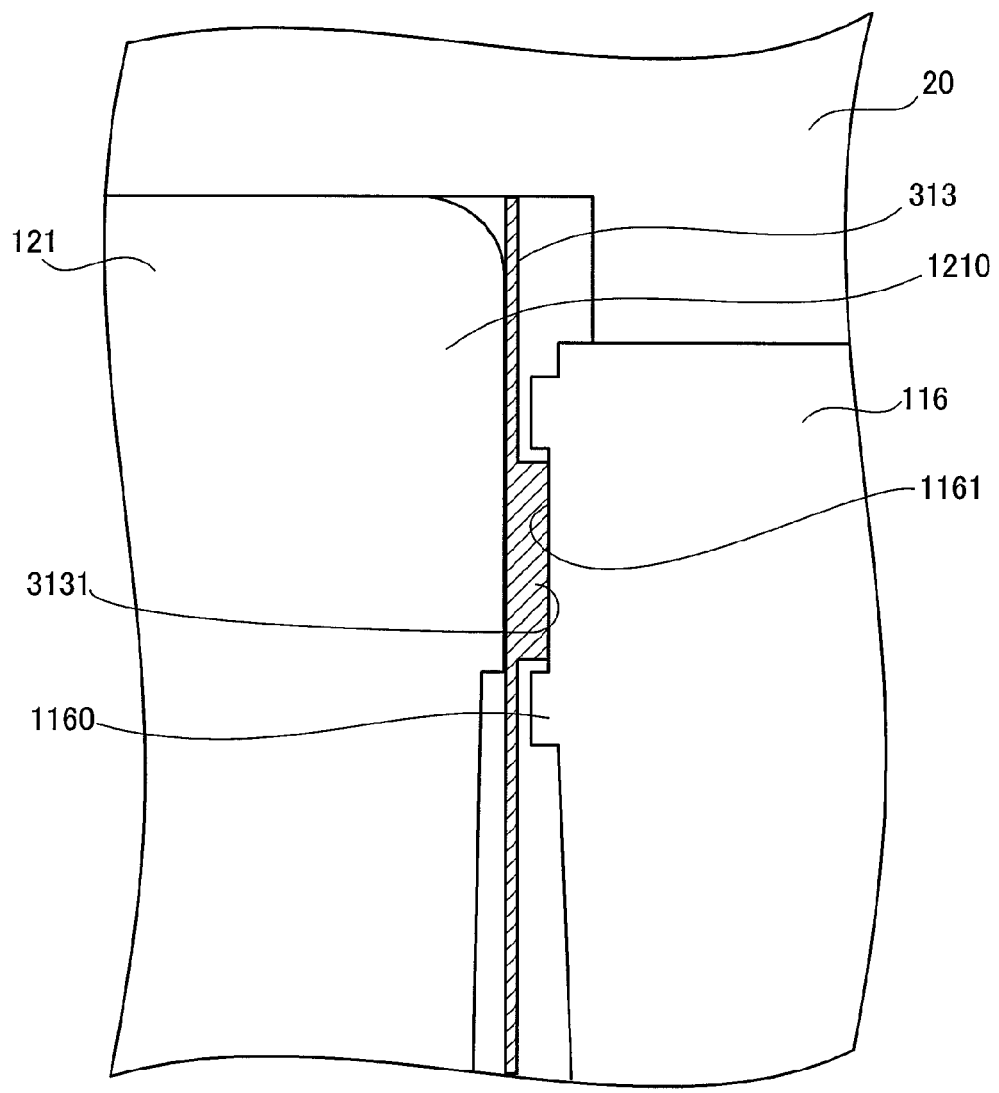
FIG. 13 is an enlarged view of a part F illustrated in FIG. 12.

FIG. 12 is a diagram that illustrates a longitudinal section of a lens unit 6 that is the sixth embodiment of the present invention. Further, FIG. 13 is an enlarged view of a part F illustrated in FIG. 12.

As illustrated in FIG. 12, the lens unit 6 of the sixth embodiment includes the three lenses 116, 121 and 131, the lens barrel 20, and the two shielding members 313 and 321.

Among the three lenses 116, 121 and 131 housed in the lens barrel 20, the first lens 116 and the second lens 121 are adjacent to each other. These three lenses 116, 121 and 131 are equivalent to an example of the plural optical components according to the present invention. Further, the first lens 116 among these three lenses 116, 121 and 131 is equivalent to an example of the first component according to the present invention.

The shielding member 313 is a sheet-like object formed by molding, for example, a polycarbonate and having a thickness of a few tens of μm, and limits a passing luminous flux. Of the two shielding members 313 and 321, the shielding member 313 is disposed at a position interposed between the first lens 116 and the second lens 121 adjacent to each other. This shielding member 313 disposed at the position interposed between the first lens 116 and the second lens 121 adjacent to each other is equivalent to an example of the shielding member according to the present invention.

As illustrated in FIG. 13, a second depression 1161 is formed at a flange section 1160 of the first lens 116, of the first lens 116 and the second lens 121 between which the shielding member 313 is interposed. Of this first lens 116, a part where the second depression 1161 is formed is equivalent to an example of the position regulating section according to the present invention, and the second depression 1161 is equivalent to an example of the second depression according to the present invention.

Further, as illustrated in FIG. 13, the shielding member 313 disposed at the position interposed between the first lens 116 and the second lens 121 adjacent to each other has a second protrusion 3131 to be received by the second depression 1161 of the first lens 116 and protruding toward the first lens 116. Of this shielding member 3131, a part where the second protrusion 3131 is provided is equivalent to an example of the engagement section according to the present invention, and the second protrusion 3131 is equivalent to an example of the second protrusion according to the present invention.

Further, as illustrated in FIG. 13, the second protrusion 3131 of the shielding member 313 is formed to be higher than the second depression 1161 of the first lens 116, and the second protrusion 3131 of the shielding member 313 entering into the second depression 1161 of the first lens 116 contacts the second depression 1161 of the first lens 116.

According to the lens unit 6 of the sixth embodiment, the second protrusion 3131 formed on the shielding member 313 and protruding toward the first lens 116 is received by the second depression 1161 of the first lens 116, and thereby the position of the shielding member 313 in a direction crossing the optical axis is regulated, and a misalignment of the shielding member 313 in the direction crossing the optical axis is prevented.

According to the lens unit 6 of the sixth embodiment, the shielding member 313 contacts both of the first lens 116 and the second lens 121 and thus, the shielding member 313 is fixed further reliably.

This concludes the description of the sixth embodiment of the present invention, and a seventh embodiment of the present invention will be described.

Incidentally, the seventh embodiment to be described below is an embodiment in which the shielding member 313 of the sixth embodiment is replaced with a shielding member 314 different from this shielding member 313.

In the following, the same elements as those in the sixth embodiment will be given the same reference characters as those of the sixth embodiment and the description will be omitted, and only features different from the sixth embodiment will be described.

Figure 14:
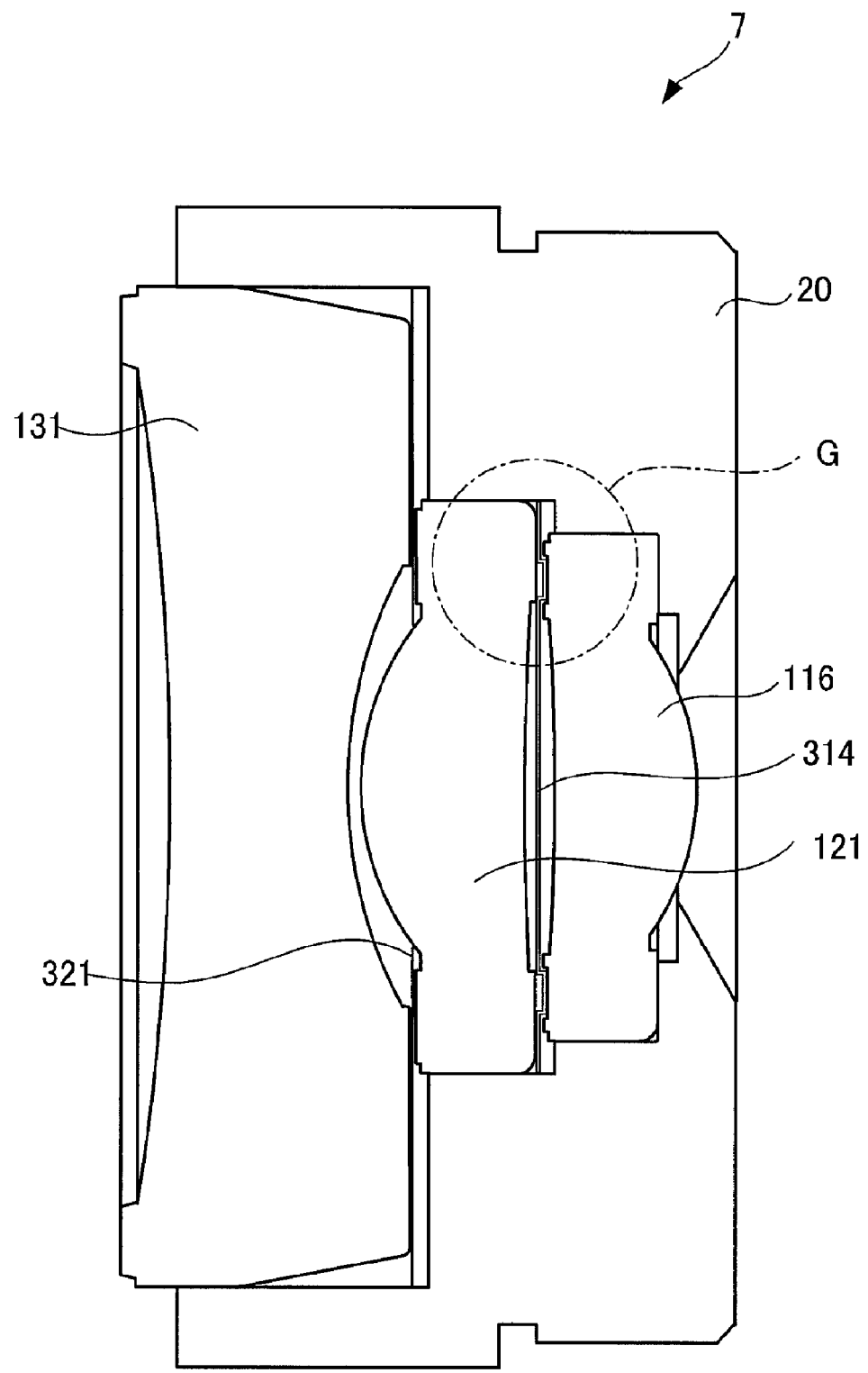
FIG. 14 is a diagram that illustrates a longitudinal section of a lens unit 7 that is the seventh embodiment of the present invention.

FIG. 14 is a diagram that illustrates a longitudinal section of a lens unit 7 that is the seventh embodiment of the present invention. Further, FIG. 15 is an enlarged view of a part G illustrated in FIG. 14.

As illustrated in FIG. 14, the lens unit 7 of the seventh embodiment includes the three lenses 116, 121 and 131, the lens barrel 20, and the two shielding members 314 and 321.

The shielding member 314 is a sheet-like object formed by molding, for example, a polycarbonate and having a thickness of a few tens of μm, and limits a passing luminous flux. Of the two shielding members 314 and 321, the shielding member 314 is disposed at a position interposed between the first lens 116 and the second lens 121 adjacent to each other. This shielding member 314 disposed at the position interposed between the first lens 116 and the second lens 121 adjacent to each other is equivalent to an example of the shielding member according to the present invention.

Figure 15:
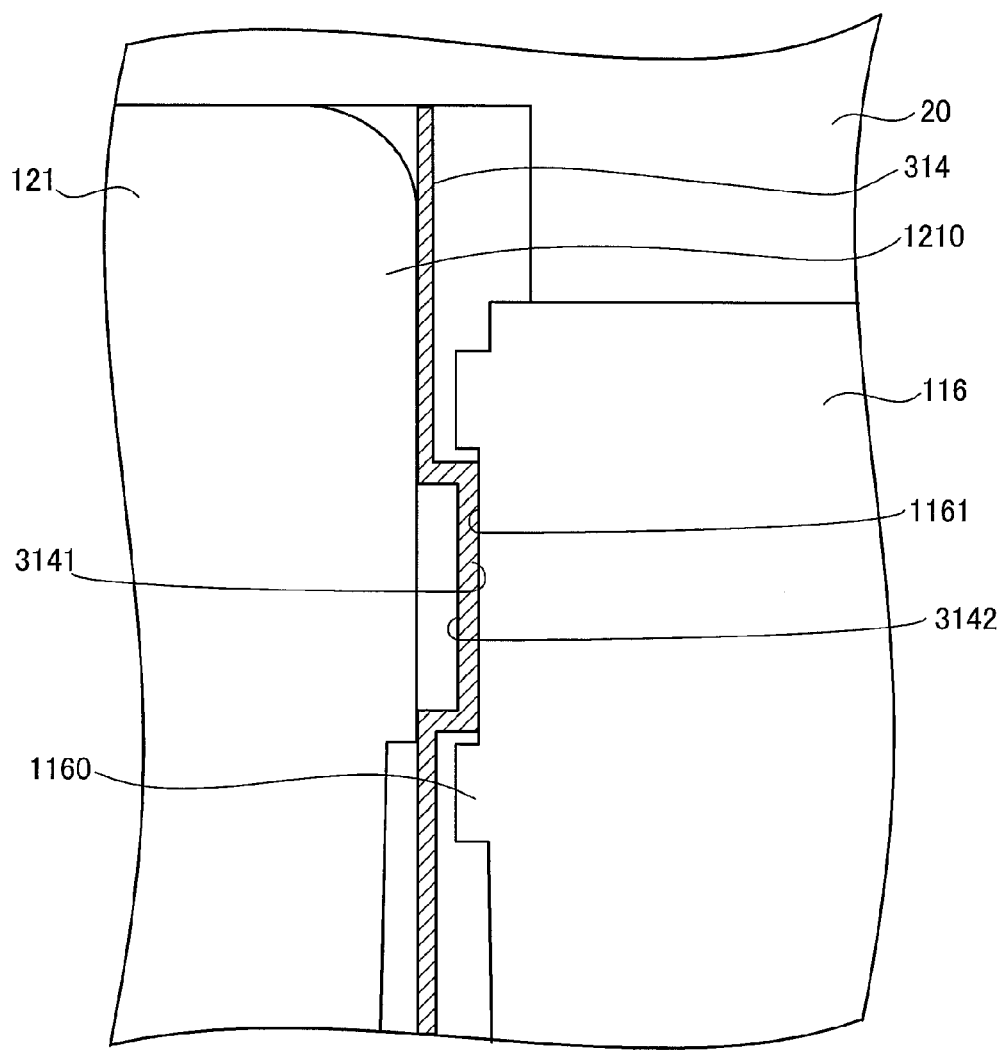
FIG. 15 is an enlarged view of a part G illustrated in FIG. 14.

Further, as illustrated in FIG. 15, the shielding member 314 disposed at the position interposed between the first lens 116 and the second lens 121 adjacent to each other has a second protrusion 3141 to be received by the second depression 1161 of the first lens 116 and protruding toward the first lens 116. This second protrusion 3141 is a protrusion with a third depression 3142 formed in a surface on the second lens 121 side of the shielding member 314. Of this shielding member 314, a part where the second protrusion 3141 is provided is equivalent to an example of the engagement section according to the present invention. The second protrusion 3141 is equivalent to an example of the second protrusion according to the present invention, and the third depression 3142 is equivalent to an example of the third depression according to the present invention.

Further, as illustrated in FIG. 15, the second protrusion 3141 of the shielding member 314 is formed to be higher than the second depression 1161 of the first lens 116, and the second protrusion 3141 of the shielding member 314 entering into the second depression 1161 of the first lens 116 contacts the second depression 1161 of the first lens 116.

According to the lens unit 7 of the seventh embodiment, the second protrusion 3141 formed on the shielding member 314 and protruding toward the first lens 116 is received by the second depression 1161 of the first lens 116, and thereby the position of the shielding member 314 in a direction crossing the optical axis is regulated, and a misalignment of the shielding member 314 in the direction crossing the optical axis is prevented.

Further, according to the lens unit 7 of the seventh embodiment, the shielding member 314 contacts both of the first lens 116 and the second lens 121 and thus, the shielding member 314 is fixed further reliably.

This concludes the description of the seventh embodiment of the present invention, and an eighth embodiment of the present invention will be described.

Incidentally, the eighth embodiment to be described below is an embodiment in which the second lens 121 of the seventh embodiment is replaced with a second lens 123 different from this second lens 121.

In the following, the same elements as those in the seventh embodiment will be given the same reference characters as those of the seventh embodiment and the description will be omitted, and only features different from the seventh embodiment will be described.

Figure 16:
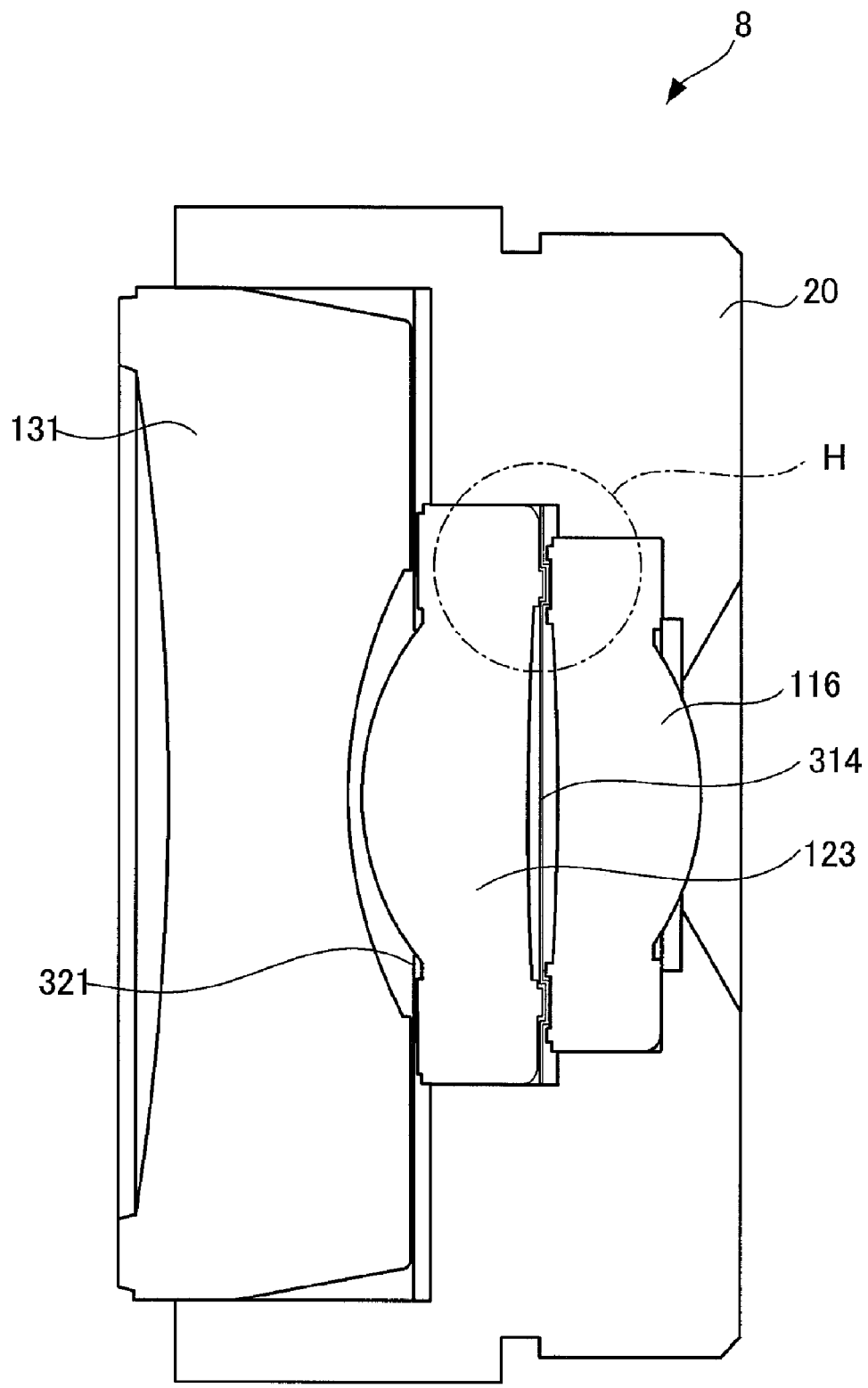
FIG. 16 is a diagram that illustrates a longitudinal section of a lens unit 8 that is the eighth embodiment of the present invention.

FIG. 16 is a diagram that illustrates a longitudinal section of a lens unit 8 that is the eighth embodiment of the present invention. Further, FIG. 17 is an enlarged view of a part H illustrated in FIG. 16.

As illustrated in FIG. 16, the lens unit 8 of the eighth embodiment includes the three lenses 116, 123 and 131, the lens barrel 20, and the two shielding members 314 and 321.

Among the three lenses 116, 123 and 131 housed in the lens barrel 20, the first lens 116 and the second lens 123 are adjacent to each other. Further, the second lens 123 and the third lens 131 among these three lenses 116, 123 and 131 are adjacent to each other. These three lenses 116, 123 and 131 are equivalent to an example of the plural optical components according to the present invention. The second lens 123 among these three lenses 116, 123 and 131 is equivalent to an example of the second component according to the present invention.

Figure 17:
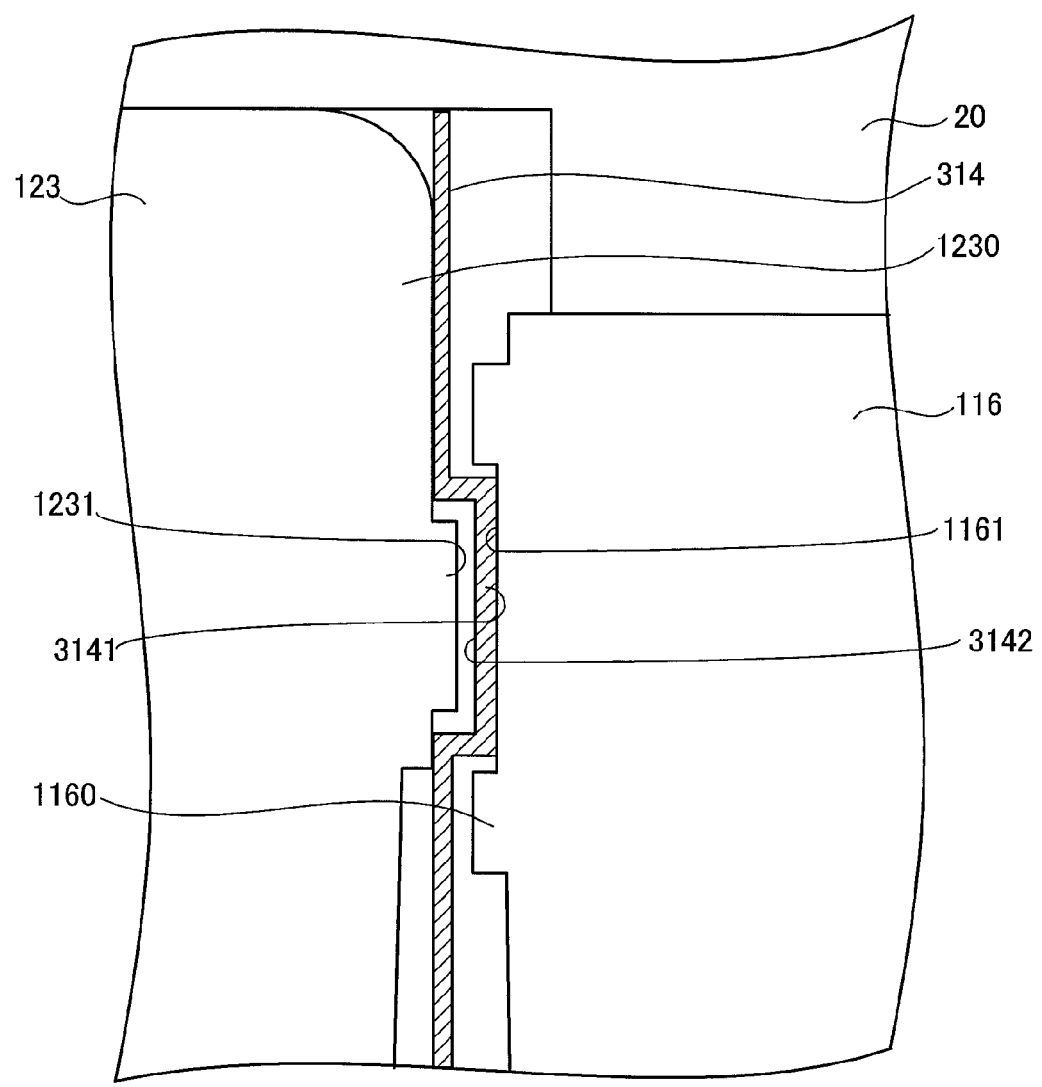
FIG. 17 is an enlarged view of a part H illustrated in FIG. 16.

Further, as illustrated in FIG. 17, at a flange section 1230 of the second lens 123, of the first lens 116 and the second lens 123 between which the shielding member 314 is interposed, there is formed a third protrusion 1231 that enters into the third depression 3142 in the surface on the second lens 123 side of the shielding member 314 and is lower than the third depression 3142 of the shielding member 314. This third protrusion 1231 of the second lens 123 is equivalent to an example of the third protrusion according to the present invention.

According to the lens unit 8 of the eighth embodiment, the second protrusion 3141 formed on the shielding member 314 and protruding toward the first lens 116 is received by the second depression 1161 of the first lens 116, and the third protrusion 1231 of the second lens 123 enters into the third depression 3142 of the shielding member 314, and thereby the position of the shielding member 314 in a direction crossing the optical axis is regulated, and a misalignment of the shielding member 314 in the direction crossing the optical axis is prevented.

Further, according to the lens unit 8 of the eighth embodiment, the shielding member 314 contacts both of the first lens 116 and the second lens 123 and thus, the shielding member 314 is fixed in further reliably.

This concludes the description of the eighth embodiment of the present invention, and a ninth embodiment of the present invention will be described.

Incidentally, the ninth embodiment to be described below is an embodiment in which the first lens 116 of the eighth embodiment is replaced with a first lens 117 different from this first lens 116.

In the following, the same elements as those in the eighth embodiment will be given the same reference characters as those of the eighth embodiment and the description will be omitted, and only features different from the eighth embodiment will be described.

Figure 18:
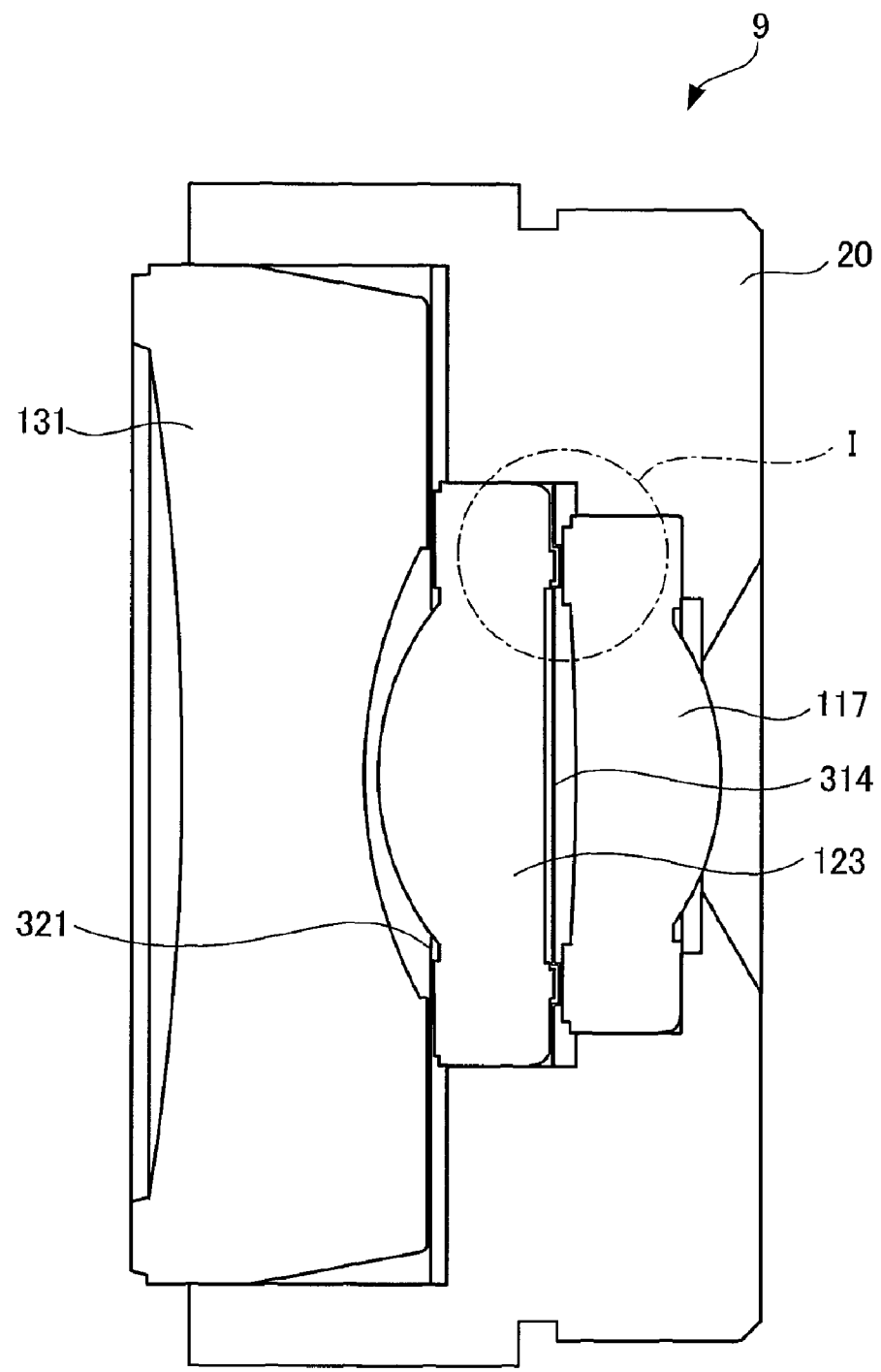
FIG. 18 is a diagram that illustrates a longitudinal section of a lens unit 9 that is the ninth embodiment of the present invention.

FIG. 18 is a diagram that illustrates a longitudinal section of a lens unit 9 that is the ninth embodiment of the present invention. Further, FIG. 19 is an enlarged view of a part I illustrated in FIG. 18.

As illustrated in FIG. 18, the lens unit 9 of the ninth embodiment includes the three lenses 117, 123 and 131, the lens barrel 20, and the two shielding members 314 and 321.

Among the three lenses 117, 123 and 131 housed in the lens barrel 20, the first lens 117 and the second lens 123 are adjacent to each other. These three lenses 117, 123 and 131 are equivalent to an example of the plural optical components according to the present invention. Further, the first lens 117 among these three lenses 117, 123 and 131 is equivalent to an example of the first component according to the present invention.

Figure 19:
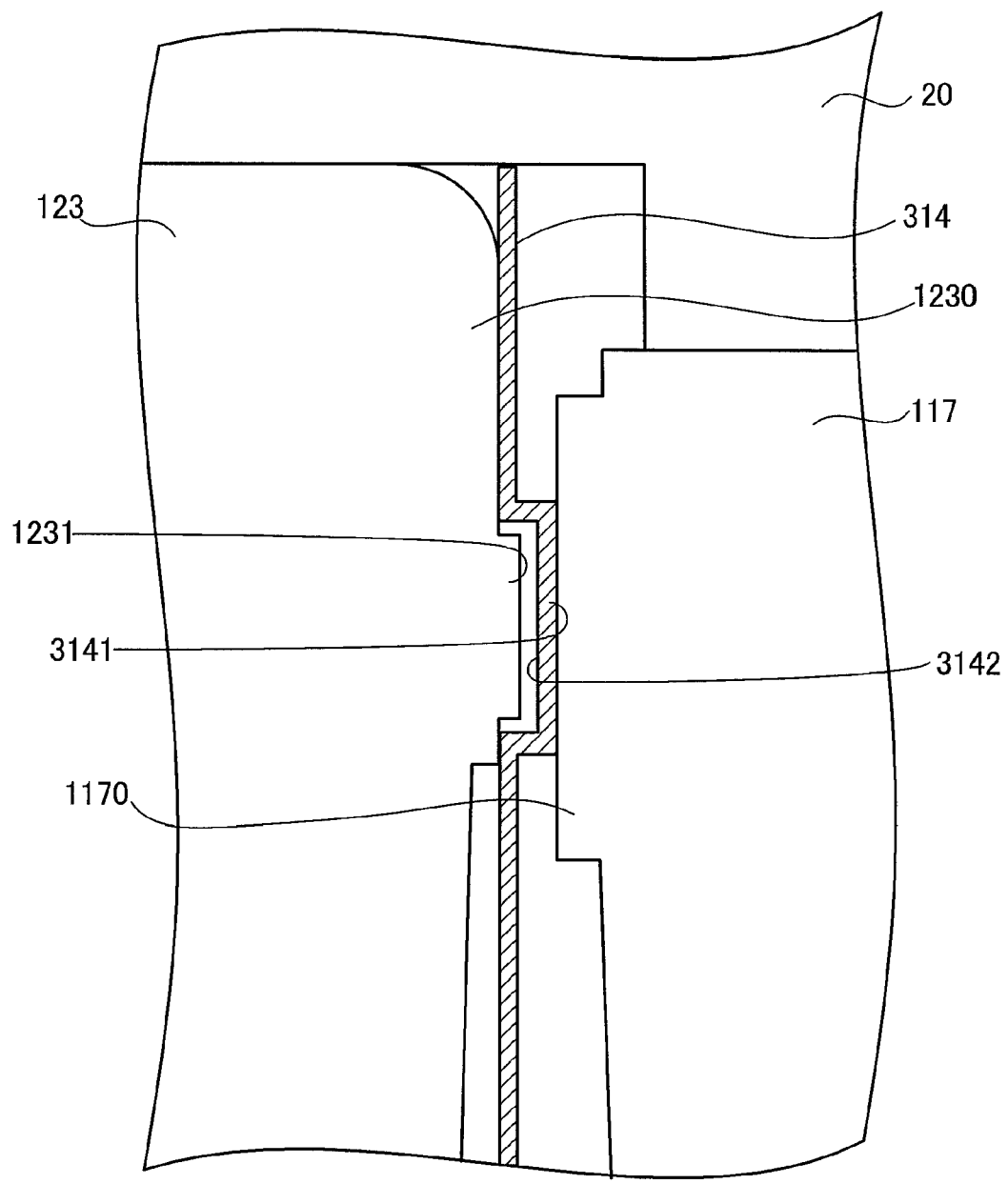
FIG. 19 is an enlarged view of a part I illustrated in FIG. 18.

Further, as illustrated in FIG. 19, the shielding member 314 disposed at a position interposed between the first lens 117 and the second lens 123 adjacent to each other has the second protrusion 3141 protruding toward the first lens 117. This second protrusion 3141 is a protrusion with the third depression 3142 in the surface on the second lens 123 side of the shielding member 314. This part, which has a shape with the third depression 3142 in the surface on the second lens 123 side of shielding member 314 and protruding toward the first lens 117, is equivalent to an example of the engagement section according to the present invention. The third depression 3142 is equivalent to an example of the third depression according to the present invention.

Further, as illustrated in FIG. 19, no depression and protrusion is formed at a flange section 1170 of the first lens 117, of the first lens 117 and the second lens 123 between which the shielding member 314 is interposed.

Furthermore, as illustrated in FIG. 19, at the flange section 1230 of the second lens 123, of the first lens 117 and the second lens 123 between which the shielding member 314 is interposed, there is formed the third protrusion 1231 that is lower than the third depression 3142 of the shielding member 314 and enters into the third depression 3142 formed in the surface on the second lens 123 side of the shielding member 314. This part where the third protrusion 1231 of the second lens 123 is formed is equivalent to an example of the position regulating section according to the present invention, and the third protrusion 1231 is equivalent to an example of the forth protrusion according to the present invention.

According to the lens unit 9 of the ninth embodiment, the third protrusion 1231 of the second lens 123 enters into the third depression 3142 formed in the surface on the second lens 123 side of the shielding member 314, and thereby the position of the shielding member 314 in a direction crossing the optical axis is regulated, and a misalignment of the shielding member 314 in the direction crossing the optical axis is prevented.

Further, according to the lens unit 9 of the ninth embodiment, the shielding member 314 contacts both of the first lens 117 and the second lens 123 and thus, the shielding member 314 is fixed further reliably.

This concludes the description of the ninth embodiment of the present invention.

Incidentally, each of the embodiments has been described above by using the example in which the three lenses are the plural optical components according to the present invention. However, the plural optical components according to the present invention are not limited to this example, and may be, for example, any number of lenses, or may be a combination of a component disposed between and linking adjacent lenses and the lenses.

Further, each of the embodiments has been described above by using the example in which the shielding member according to the present invention is the shielding member disposed at the position interposed between the first lens and the second lens adjacent to each other. However, the shielding member according to the present invention is not limited to this example, and may be a shielding member disposed at a position interposed between the second lens and the third lens adjacent to each other, or may correspond to both of the shielding members.

Furthermore, each of the first embodiment through the fourth embodiment has been described above by using the example in which the shielding member according to the present invention is the sheet-like object using the PET (polyethylene terephthalate) as the base and made of a resin. However, the shielding member in each of the first embodiment through the fourth embodiment is not limited to this example, and may be, for example, a sheet-like object formed by molding a polycarbonate, or a sheet-like object formed by processing a metal sheet.

Still furthermore, each of the fifth embodiment through the ninth embodiment has been described above by using the example in which the shielding member according to the present invention is the sheet-like object formed by molding a polycarbonate. However, the shielding member in each of the fifth embodiment through the ninth embodiment is not limited to this example, and may be, for example, a sheet-like object formed by processing a metal sheet.

Moreover, in the above-described embodiments, the protrusions, openings, and depressions formed at the two locations have been described as the examples of the position regulating section and the engagement section according to the present invention. However, each of the position regulating sections and the engagement sections may be provided at each of three or more locations, or provided at one location.

What is claimed is:

1. A lens unit comprising:
   plural optical components including a lens,
   a lens barrel that contains and holds the plural optical components; and
   a shielding member that is disposed at a position interposed between a first component and a second component adjacent each other of the optical components housed in the lens barrel and limits a passing luminous flux, wherein
   at least one of the first component and the second component has a position regulating section that regulates a position of the shielding member in a direction crossing an optical axis, and
   the shielding member has an engagement section that engages with the position regulating section, wherein
   the engagement section has an opening provided in the shielding member, and
   the position regulating section has a protrusion that is formed in the first component and enters into the opening, and wherein
   the second component has a depression at a position facing the opening, and
   the protrusion is a protrusion having a height which enables the protrusion to pass through the opening of the shielding member and enter into the depression.

2. A lens unit comprising:
   plural optical components including a lens,
   a lens barrel that contains and holds the plural optical components; and
   a shielding member that is disposed at a position interposed between a first component and a second component adjacent each other of the optical components housed in the lens barrel and limits a passing luminous flux, wherein
   at least one of the first component and the second component has a position regulating section that regulates a position of the shielding member in a direction crossing an optical axis, and
   the shielding member has an engagement section that engages with the position regulating section, wherein
   each of the position regulating section and the engagement section is provided at each of plural locations, and wherein
   the engagement section has an opening provided in the shielding member, and
   the position regulating section has a protrusion that is formed in the first component and enters into the opening, and wherein the second component has a depression at a position facing the opening, and the protrusion is a protrusion having a height which enables the protrusion to pass through the opening of the shielding member and enter into the depression.

3. A lens unit comprising:

plural optical components including a lens, a lens barrel that contains and holds the plural optical components; and a shielding member that is disposed at a position interposed between a first component and a second component adjacent each other of the optical components housed in the lens barrel and limits a passing luminous flux, wherein at least one of the first component and the second component has a position regulating section that regulates a position of the shielding member in a direction crossing an optical axis, and the shielding member has an engagement section that engages with the position regulating section, wherein the engagement section has a protrusion that is formed in the shielding member and protrudes toward the first component, and the position regulating section has a depression that is formed in the first component and receives the protrusion.

4. The lens unit according to claim 3, wherein the protrusion is a protrusion with an additional depression formed in a surface on the second component side of the shielding member.

5. The lens unit according to claim 3, wherein the protrusion is a protrusion with an additional depression formed in a surface on the second component side of the shielding member, and the second component has an additional protrusion that enters into said additional depression.

6. A lens unit comprising:

plural optical components including a lens, a lens barrel that contains and holds the plural optical components; and a shielding member that is disposed at a position interposed between a first component and a second component adjacent each other of the optical components housed in the lens barrel and limits a passing luminous flux, wherein at least one of the first component and the second component has a position regulating section that regulates a position of the shielding member in a direction crossing an optical axis, and the shielding member has an engagement section that engages with the position regulating section, wherein each of the position regulating section and the engagement section is provided at each of plural locations, and wherein the engagement section has a protrusion that is formed in the shielding member and protrudes toward the first component, and the position regulating section has a depression that is formed in the first component and receives the protrusion.

7. The lens unit according to claim 6, wherein the protrusion is a protrusion with an additional depression formed in a surface on the second component side of the shielding member.

8. The lens unit according to claim 6, wherein the protrusion is a protrusion with an additional depression formed in a surface on the second component side of the shielding member, and the second component has an additional protrusion that enters into said additional depression.

9. A lens unit comprising:

plural optical components including a lens, a lens barrel that contains and holds the plural optical components; and a shielding member that is disposed at a position interposed between a first component and a second component adjacent each other of the optical components housed in the lens barrel and limits a passing luminous flux, wherein at least one of the first component and the second component has a position regulating section that regulates a position of the shielding member in a direction crossing an optical axis, and the shielding member has an engagement section that engages with the position regulating section, wherein the engagement section has a shape with a depression formed in a surface on the second component side of the shielding member and protruding toward the first component, and the position regulating section has a protrusion that is formed in the second component and enters into the depression.

10. A lens unit comprising:

plural optical components including a lens, a lens barrel that contains and holds the plural optical components; and a shielding member that is disposed at a position interposed between a first component and a second component adjacent each other of the optical components housed in the lens barrel and limits a passing luminous flux, wherein at least one of the first component and the second component has a position regulating section that regulates a position of the shielding member in a direction crossing an optical axis, and the shielding member has an engagement section that engages with the position regulating section, wherein each of the position regulating section and the engagement section is provided at each of plural locations, and wherein the engagement section has a shape with a depression formed in a surface on the second component side of the shielding member and protruding toward the first component, and the position regulating section has a protrusion that is formed in the second component and enters into the depression.

* * * * *